United States Patent
Oyama

(10) Patent No.: US 7,195,171 B2
(45) Date of Patent: Mar. 27, 2007

(54) IMAGE FORMING METHOD AND SYSTEM

(75) Inventor: Kiyoshi Oyama, Shinjuku-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/438,626

(22) Filed: May 22, 2006

(65) Prior Publication Data
US 2006/0266818 A1 Nov. 30, 2006

(30) Foreign Application Priority Data
May 27, 2005 (JP) ............... 2005-156198

(51) Int. Cl.
G06K 13/00 (2006.01)
G06K 19/00 (2006.01)
(52) U.S. Cl. ............... 235/475; 235/487
(58) Field of Classification Search ........ 235/475, 235/487, 492
See application file for complete search history.

(56) References Cited

U.S. PATENT DOCUMENTS 7,048,194 B2 * 5/2006 Minami et al. ......... 235/492
2002/0170973 A1 * 11/2002 Teraura ............... 235/492
2004/0046985 A1 * 3/2004 Watanabe et al. ....... 358/1.13

FOREIGN PATENT DOCUMENTS

JP 59-121070 A 7/1984
JP 10-198105 A 7/1998

* cited by examiner

Primary Examiner—Thien M. Le
Assistant Examiner—April A. Taylor
(74) Attorney, Agent, or Firm—Canon U.S.A. Inc IP Div

(57) ABSTRACT

Print jobs having a mixture of first image sheets and second image sheets are sorted to a first image forming device and a second image forming device. After image formation is performed on sheets by the respective image forming devices, radio frequency IC tags (RFID tags) are affixed to the sheets, in which attribute information including post-processing information and page identification information is written. Sheet bundles produced by the respective image forming devices are separately set to a post-processing device. The post-processing device reads out the attribute information stored in the radio frequency IC tags, and the sheets are selectively fed from the respective sheet bundles while conforming to the page order. Thereafter, the post processing is performed.

5 Claims, 21 Drawing Sheets

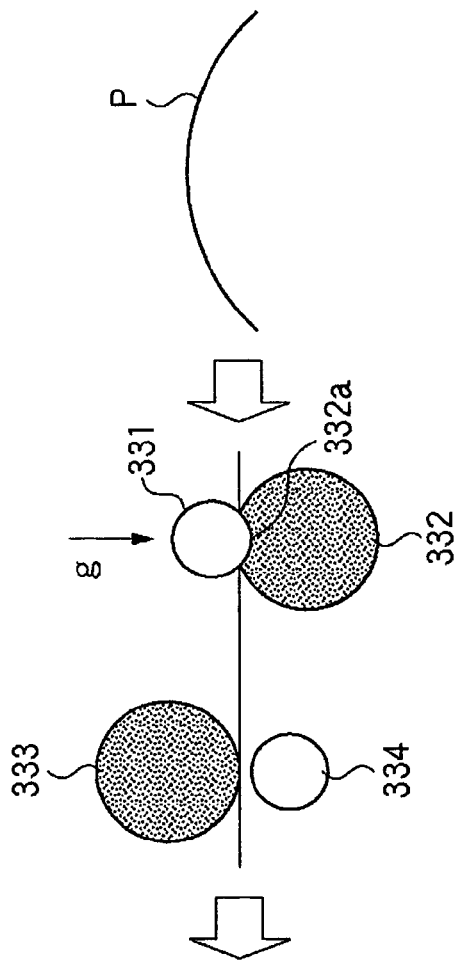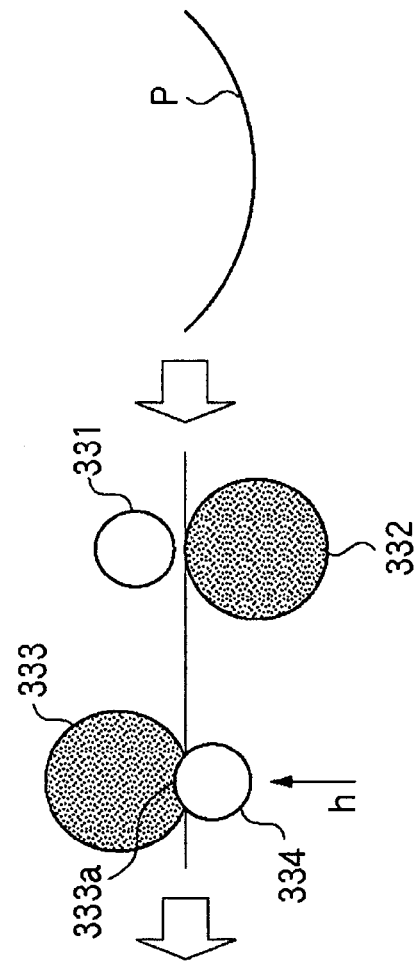

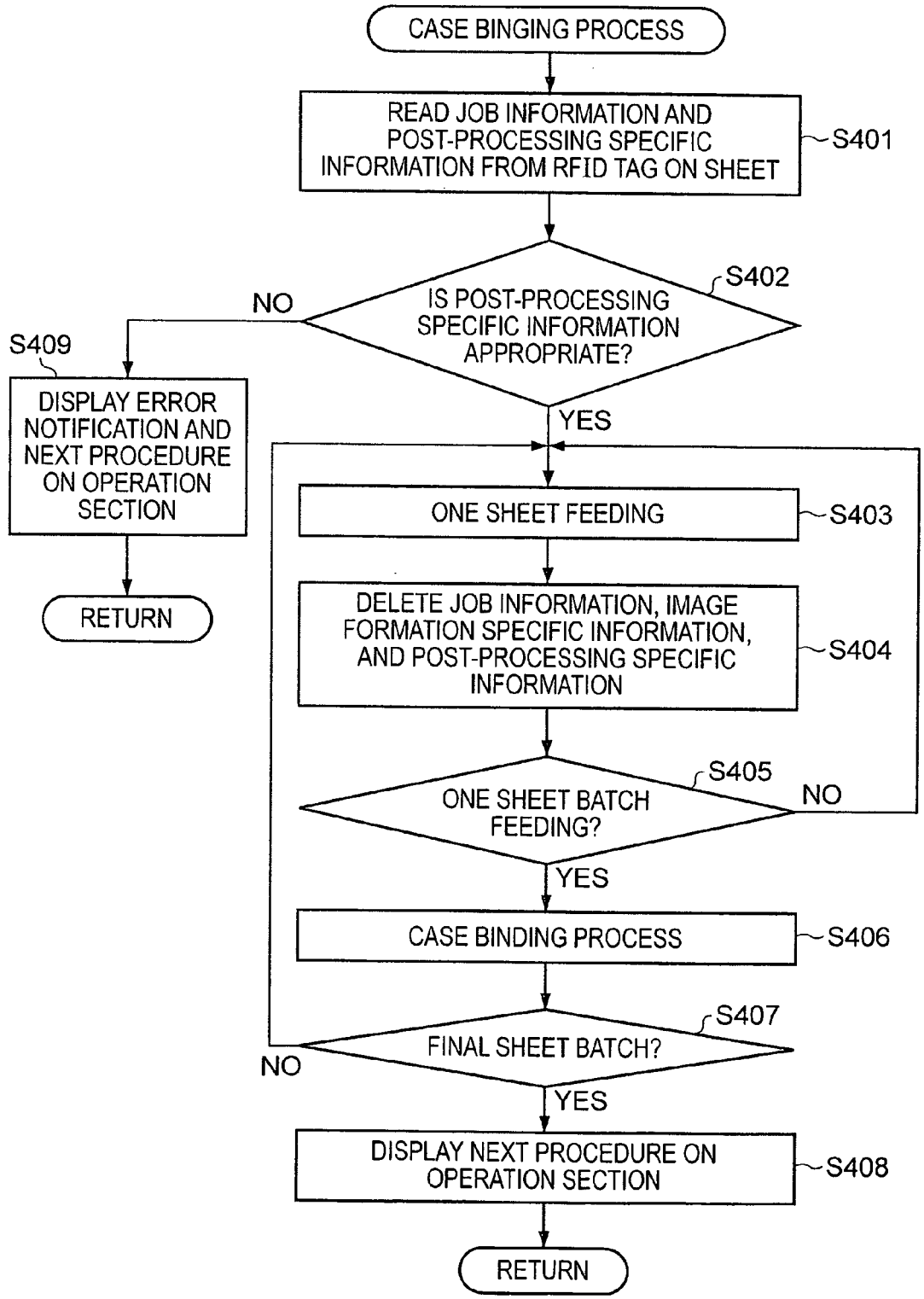

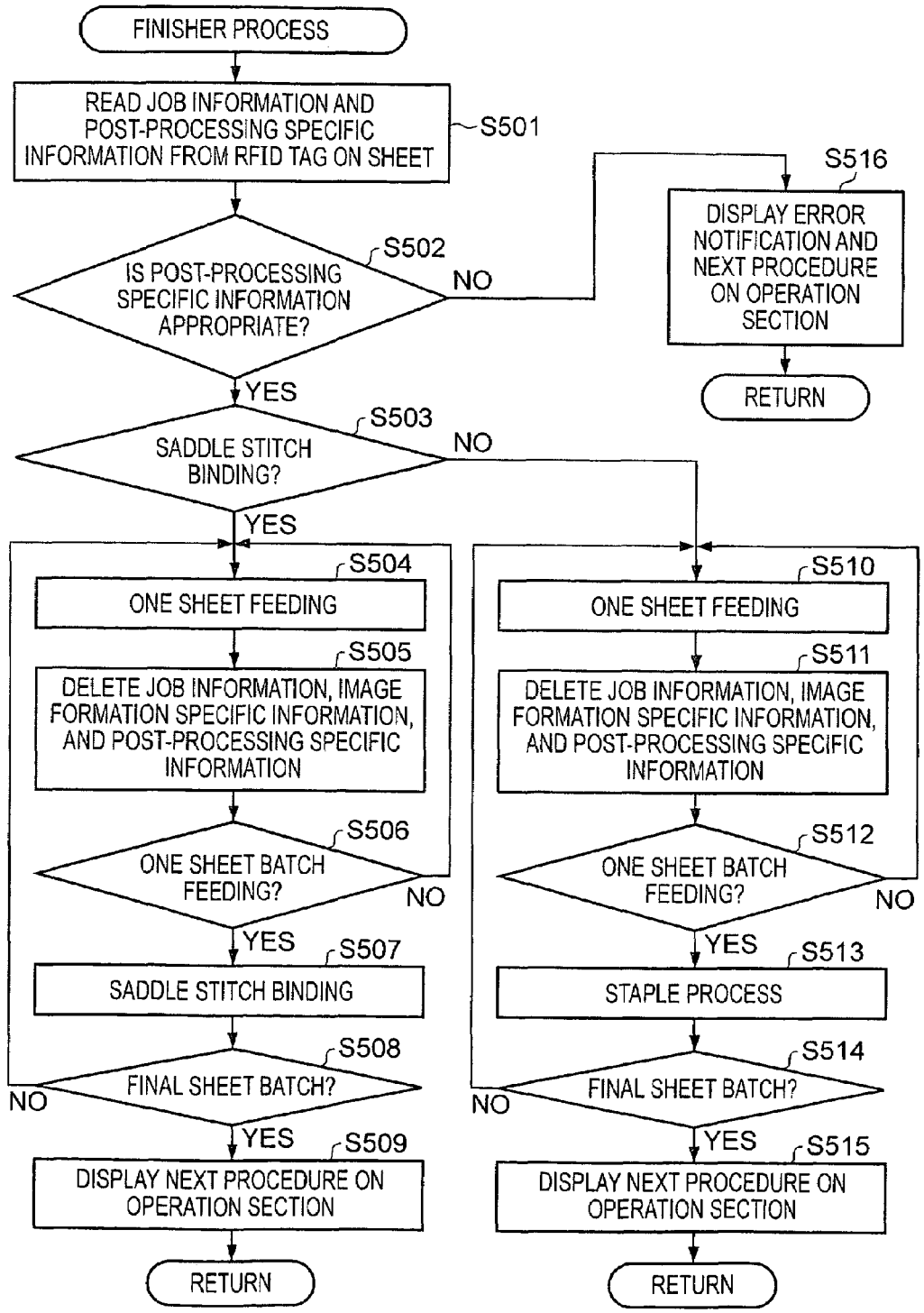

FIG. 21A

```
JOB INFORMATION
    JOB ID                              XXXXX                          —601
    TOTAL PAGE NUMBER                   40 PAGES                       —602
    SINGLE-SIDED/DOUBLE-SIDED PRINTING  DOUBLE-SIDED                   —603
    COLOR PRINT SHEET No.               1-5, 16-20                     —604
    THE NUMBER OF COPIES                4 COPIES,
                                        TOTAL SHEET NUMBER: 20         —605

SHEET TYPE                          PLAIN PAPER  ⎫
    SHEET SIZE                          A4           ⎭                 —606
    COLLATING OR NOT/
    POST-PROCESSING ORDER               1
    STAPLING OR NOT/
    POST-PROCESSING ORDER               0
    SADDLE STITCHING OR NOT/                                            —607
    POST-PROCESSING ORDER               0
    CASE BINDING OR NOT/
    POST-PROCESSING ORDER               2
```

FIG. 21B

```
IMAGE FORMATION SPECIFIC INFORMATION
    IMAGE FORMATION TIME        12:15:25                    —701
    SHEET No.                   03                          —702
    No. OF TOTAL SHEETS         0203                        —703
    FRONT SURFACE AVERAGE DENSITY   Y10%, M5%, C8%, Bk15% ⎫ —704
    REAR SURFACE AVERAGE DENSITY    Y0%, M0%, C0%, Bk8%   ⎭
```

FIG. 21C

```
POST-PROCESSING SPECIFIC INFORMATION
    COLLATING PROCESS       UNPROCESSED     —804
    STAPLE PROCESS          UNPROCESSED     —805
    SADDLE STITCH PROCESS   UNPROCESSED     —806
    BASE BINDING PROCESS    UNPROCESSED     —807
```

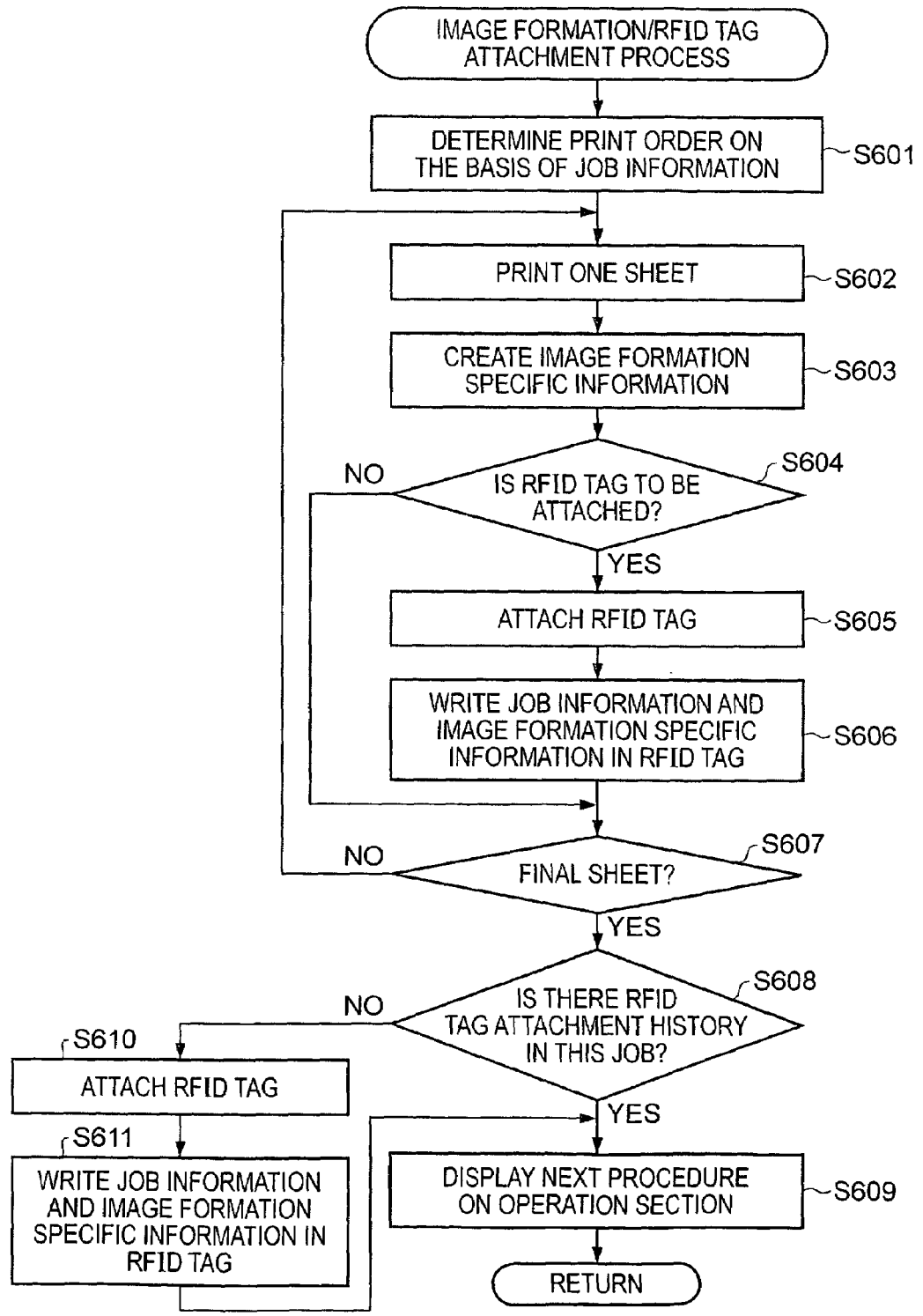

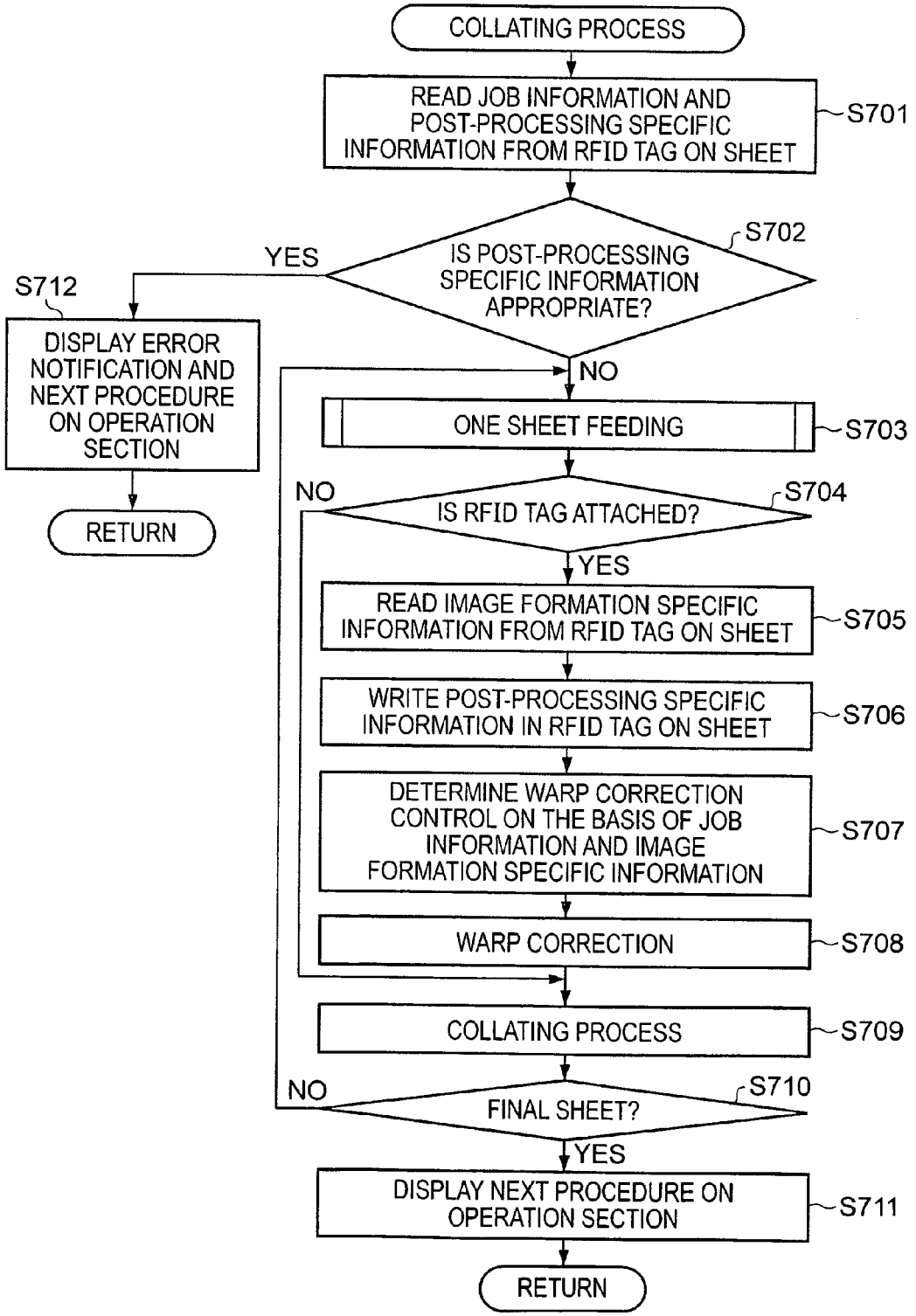

IMAGE FORMING METHOD AND SYSTEM

BACKGROUND OF THE INVENTION

1. Field of the Invention

The present invention relates to an image forming method and system, and in particular, an image forming system including an image forming device, such as a copier, a printer, or an on-demand printer of an electronic photographic method or an electrostatic recording method, and a post-processing device for performing post processing after image formation, such as book binding or sheet folding and a control method therefor. In addition, the invention relates to an image processing device incorporated with the image forming system, an image forming device, and a post-processing device, and a control method therefor.

2. Description of Related Art

A print process on a print medium, such as a sheet of paper, includes a number of processes such as a plate making process of making a plate from an original, a press plate process of making a press plate which is actually applied with ink from the plate, and a printing process of installing the press plate to a printing machine for conducting printing. Therefore, it takes much time to obtain the final products. Also, a large number of steps in making the plate and the press plate and in adjusting the printing machine are required, and the cost of equipment for the printing machine itself is extremely high. Thus, the printing of a large number of copies and the reduction in cost performance are essential requirements for minimizing the high cost in conducting printing.

Meanwhile, in recent years, along with the development in information processing technology and printing device functions, digital data created with use of desk top publishing (DTP), etc., can be directly printed by a printer based on an electrophotographic system or the like without processing through the print making process and the press plate process. As a result, it is possible to execute printing for a small number of copies in a short delivery period.

Then, in some cases, these printing devices are provided with post-processing devices such as a finisher, a sorter, a collator (collating device), and a machine for sealed cover creation or book binding. While print attributes for causing these post-processing devices to accurately operate are set to a controller of the printing machine, execution of a series of operations from the printing to book binding at once is beginning to be possible substantially without any manual operation. This technology belongs to a technical field called on-demand printing, in which printing with a small number of lots and printing of direct mails with individual messages printed thereon can be realized at a low cost.

In such a system using the printing devices and the post-processing devices, these devices are generally connected in series, and control sections mounted in the printed devices are connected online to the post-processing devices, whereby all the devices including the post-processing devices are correctively controlled.

However, a contractor of the on-demand printing usually owns a plurality of printing devices and uses an appropriate printing device depending on the number of copies and the printing type ordered by the printing customer. For example, in the case where printing products mixed with color pages and monochrome pages are produced, the color pages are printed by a color printer and the monochrome pages are printed by a monochrome printer. This is because the case of conducting monochrome printing by the color printer costs more than the case of conducting monochrome printing by the monochrome-printing dedicated printer. As in this example, when the final products contain the mixture of color and monochrome printed products, an operator needs take the printed products out of at least one of the printing devices by hand and insert the printed products into the other printing device's printed products. In such a situation where interruption of the printing products is necessary, it is difficult to automatically produce the final products containing the mixture of color and monochrome printed products by controlling the post-processing devices with a control section provided to one of the printing devices.

On the other hand, modes for binding the final products include saddle stitching binding in which a sheet bundle is folded in the center and the folded part is bound with a staple or the like, simple binding in which a sheet bundle is not folded and an end part of the sheet is bound with a staple or the like, and case binding in which a back of a sheet bundle is glued with a binding tape or the like. To cope with the above-mentioned modes, it is necessary to appropriately use a plurality of post-processing devices including a finisher for performing the saddle stitching binding and the simple binding and a case binding finisher for performing the case binding.

Therefore, in the case where a plurality of post-processing devices are connected in series to a plurality of printing devices, respectively, duplication of the necessary printing devices and post-processing devices occurs, thereby leading to an enormous waste in equipment preparation.

In view of the above, when various post-processing devices are shared by a plurality of printing devices, it is useful to adopt offline post-processing devices, which are not connected to the control sections of the printing devices. However, in order to obtain the final products while a plurality of offline post-processing devices are operated in association with each other, setting of print attributes needs to be manually performed for each of the post-processing devices. This operation is bothersome and there is the problem in that erroneous setting may happen.

To cope with this problem, for example, Japanese Patent Laid-Open No. 59-121070 discloses an example in which a barcode corresponding to a print attribute is printed and added on the print product itself by the printing device, and the barcode is read by a barcode reader arranged on a sheet path on the upstream side of the post-process device, thereby controlling the post-process device.

Then, according to Japanese Patent Laid-Open No. 10-198105, a so-called "job sheet" corresponding to a print attribute is printed by the printing device separate from the printed products. Pieces of character information indicating the print attributes and the like and barcodes corresponding to the character information are written on the job sheet. An operator reads a barcode section corresponding to a desired process written on the job sheet by using a handy barcode reader arranged on the post-process device to control the post-process device. In this way, even when an offline post-process device is used, without setting the individual print attributes or the like, it is possible to automatically perform the post-processing operation substantially automatic as the online post processing.

However, in order to obtain the final products while a plurality of offline post-processing devices are operated in association with each other, it is necessary to find out the point at which the post processing for the printed products has been completed in view of the prevention of operational errors. To attain the finding, it is necessary to leave a history of the post processing on the printed products.

On the contrary, the barcodes used in the above-mentioned related-art examples cannot be rewritten, so it is impossible to leave the post processing history on the printed products or the job sheets.

That is, when the print attributes are added on the printed products by way of barcodes as described in Japanese Patent Laid-Open No. 59-121070, the barcodes are left on the final products and a problem occurs in view of appearance. Therefore, the barcodes should be made smaller even if added to the printed products and the information amount to be recorded on the barcodes is accordingly limited. Thus, it is impossible to add high level print attributes like associating information for the plurality of post processings.

Also, according to Japanese Patent Laid-Open No. 10-198105, an operator writes a mark on the job sheet with a pen or the like and then reads a barcode corresponding to the mark with a barcode reader to add print attributes. As described above, this operation itself is bothersome, and also a pen input mistake or a selection mistake of the read-target barcode may be made by the operator.

Incidentally, a technology significantly spreading in recent years is radio frequency identification (RFID) tags (hereinafter, referred to as RFID tag). This RFID tag is structured to be batteryless and data stored in an internal memory of the RFID tag can be read out or written in with an exclusive reader/writer in a non-contact manner. Also, computerization density is extremely high because the memory element is used. Furthermore, a chip with the size of 1 mm or smaller, called "μ chip" (manufactured by Hitachi, Ltd.), has also been developed. The chip is high in mountability to various media.

This RFID tag is desirably applied to the control of the post processing.

SUMMARY OF THE INVENTION

The present invention is directed to a control method for an image forming system.

According to one aspect of the present invention, there is provided a control method for an image forming system that includes first and second image forming devices performing image formation on sheets and at least one post-processing device performing a post processing on the sheets which have been subjected to image formation by the image forming devices.

The method includes sorting print jobs to the first image forming device and the second image forming device; performing image formation on the sheet with the first image forming device; writing attribute information including job information for indicating a post processing to be executed and identification information for identifying a page order of the sheets, in a memory of a radio frequency IC tag affixed to the sheet which has been subjected to the image formation by the first image forming device and which is placed on a first tray of the post-processing device; performing image formation on the sheet with the second image forming device; writing attribute information including job information for indicating a post processing to be executed and identification information for identifying a page order of the sheets, in a memory of a radio frequency IC tag affixed to the sheet which has been subjected to the image formation by the second image forming device and which is placed on a second tray of the post-processing device; reading out with the post-processing device the attribute information from the memories of the radio frequency IC tags affixed to the sheets in the sheet bundle placed on the first tray and in the sheet bundle placed on the second tray; selectively feeding the sheets from the sheets in the sheet bundle placed on the first tray and the sheets in the sheet bundle placed on the second tray on the basis of the read-out attribute information; and executing the post processing on the fed sheets.

As described above, according to the present invention, by attaching the RFID tag to the recording medium, it is possible to construct the image forming system enabling the automatic operation by using one post-processing device or associating the plurality of the offline post-processing devices with each other. As a result, it is possible to significantly improve the productivity in the on-demand printing.

Further features of the present invention will become apparent from the following description of exemplary embodiments with reference to the attached drawings.

BRIEF DESCRIPTION OF THE DRAWINGS

FIGS. 12A and 12B are cross-sectional views showing a schematic view of a warp correction unit according to the embodiment.

FIG. 19 is a flowchart of a sub routine for describing a case binding process according to the embodiment.

FIG. 20 is a flowchart of a sub routine for describing a finishing process according to the embodiment.

FIGS. 21A, 21B, and 21C are drawings for describing content examples of job time information, image formation specific information, and post-processing specific information according to the embodiment.

FIG. 23 is a flowchart of a sub routine for describing a second operational example of image formation and RFID tag affixation according to the embodiment.

FIG. 24 is a flowchart of a sub routine for describing a second operational example of a collating process according to the embodiment.

DESCRIPTION OF THE EMBODIMENTS

Hereinafter, embodiments of the present invention will be described with reference to the accompanying drawings. It should be noted that this embodiment demonstrates two specific examples: a first operational example where an RFID tag is attached to every sheet; and a second operational example where an RFID tag is attached only to a sheet which needs "warp correction". The second operational example includes, but not limited to, attachment of the RFID tag on upper and lower ends of the sheet bundle and attachment of the RFID tag on either the upper or lower ends.

Image Forming System According to the Embodiment

Figure 1:
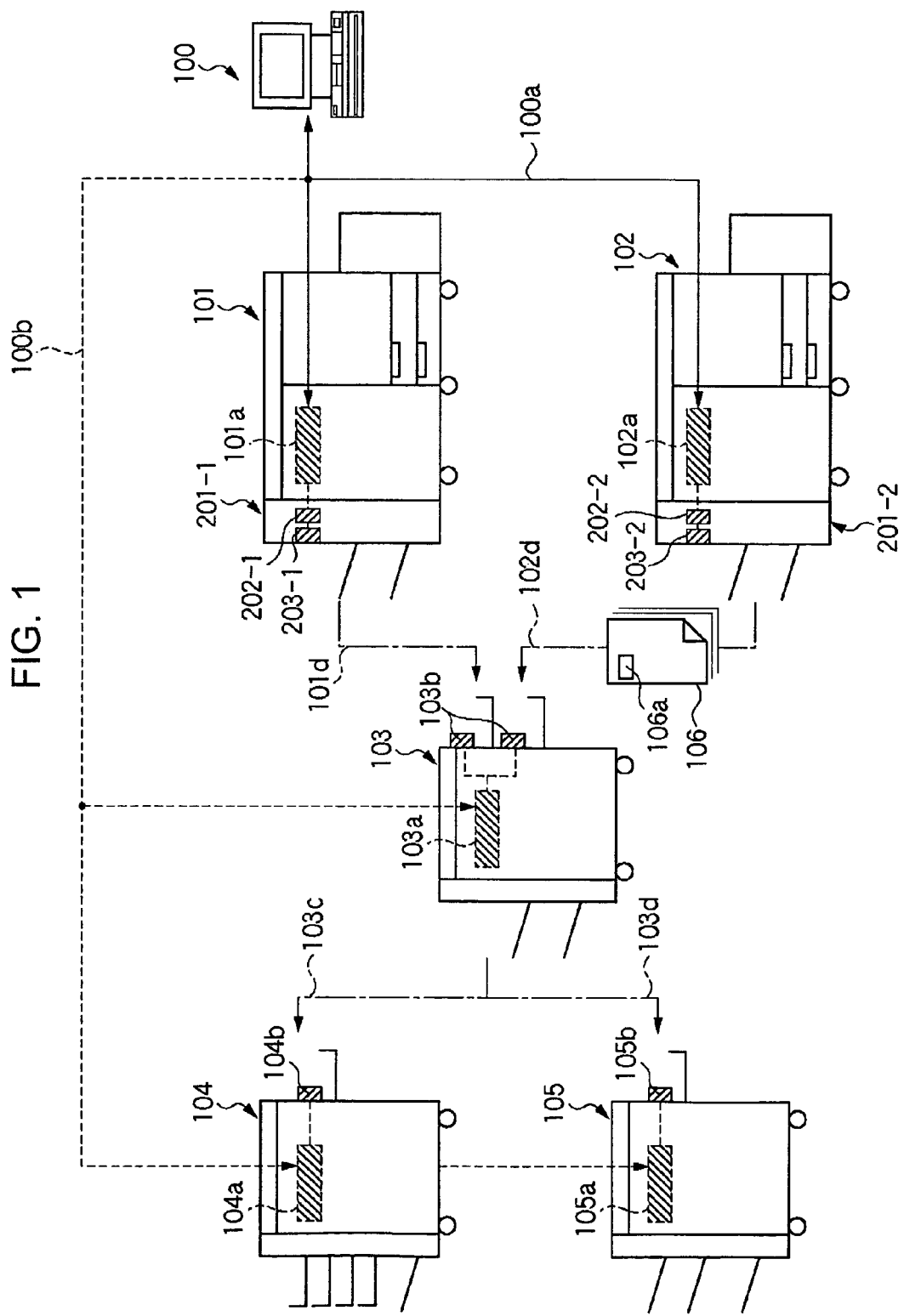
FIG. 1 shows a schematic view of an image forming system according to an embodiment of the present invention.

FIG. 1 shows a schematic construction of an image forming system according to one embodiment of the present invention.

Reference numeral 100 denotes a computer for operating application software to create various documents and graphics and to output these documents with use of printer activation software called a printer driver. Reference numerals 101 and 102 denote a full color printer and a monochrome printer for performing image formation on sheets, respectively. Reference numeral 103 denotes a collator for mixing and collating the output monochrome print sheets and the output color print sheets in a specified order after being removed from these printers and set. Reference numerals 104 and 105 denote a case binding machine and a finisher for simple binding for setting the sheet bundle after the collation has been performed by the collator to obtain final products.

Control sections 101a and 102a of the respective printers are connected online via the computer 100 and a network 100a, whereby image information corresponding to the respective sheets and job information including post-processing information that is common information are distributed.

RFID tag attachment devices 201-1 and 201-2 for attaching RFID tags 106a to sheets 106 are connected at the downstream sides in the sheet conveyance direction of the printers 101 and 102. The RFID tag attachment devices 201-1 and 201-2 respectively include tag affixers 202-1 and 202-2 and readers/writers 203-1 and 203-2 for writing information in the RFID tags. The sheet attribute information including the job information is written in the RFID tags by the control sections 101a and 102a. It should be noted that the readers/writers 203-1 and 203-2 may be used for writing only.

The printers 101 and 102 and the post-processing devices 103, 104, and 105 are not electrically connected to each other and the post-processing devices function as offline type post-processing devices. The post-processing devices respectively include readers/writers 103b, 104b, and 105b for reading information written in the RFID tag 106a and writing specific information about the respective post-processing devices in the RFID tag 106a. Control sections 103a, 104a, and 105a of the post-processing devices 103, 104, and 105 conduct post processings on the basis of sheet attribute information written in the sheets 106. It should be noted that, as will be described later, in actual, the readers/writers 103b, 104b, and 105b are composed of readers/writers 303, 304, 402, and 502 for reading and readers/writers 306, 407, and 507 for writing. Thus, these readers/writers may be used for reading only or for writing only.

Then, delivery and receipt represented by reference numerals 101d, 102d, 103c, and 103d between the image forming devices 101 and 102 and the post-processing devices 103, 104, and 105 may be performed through manual operation by an operator or automatic operation by a conveying device.

It should be noted that a network 100b indicated by a broken line of FIG. 1 is another example adapted to connect the computer 100 to the post-processing devices 103, 104, and 105. In this example, the computer 100 can comprehensively control the image forming devices 101 and 102 and the post-processing devices 103, 104, and 105. For example, by changing control programs in the control sections 101a to 105a, it is also possible to flexibly change the system to be in the first operational example mode or in the second operational example mode.

Hereinafter, the respective components of the image forming system according to this embodiment will be further described. It should be noted that in the following description, the printers 101 and 102 and the RFID tag attachment device 201, all of which are image forming devices, will be described as an independent device. It should be noted that as described above the RFID tag attachment device 201 is controlled by the control sections 101a and 102a of the printers 101 and 102 in general and is usually added to the printers 101 and 102 as an optional device. However, the RFID tag attachment device 201 may be integrated within the printers 101 and 102 in advance.

Configuration of the Color Printer 101

Next, an example configuration of the color printer 101 will be described with reference to FIG. 2.

Figure 2:
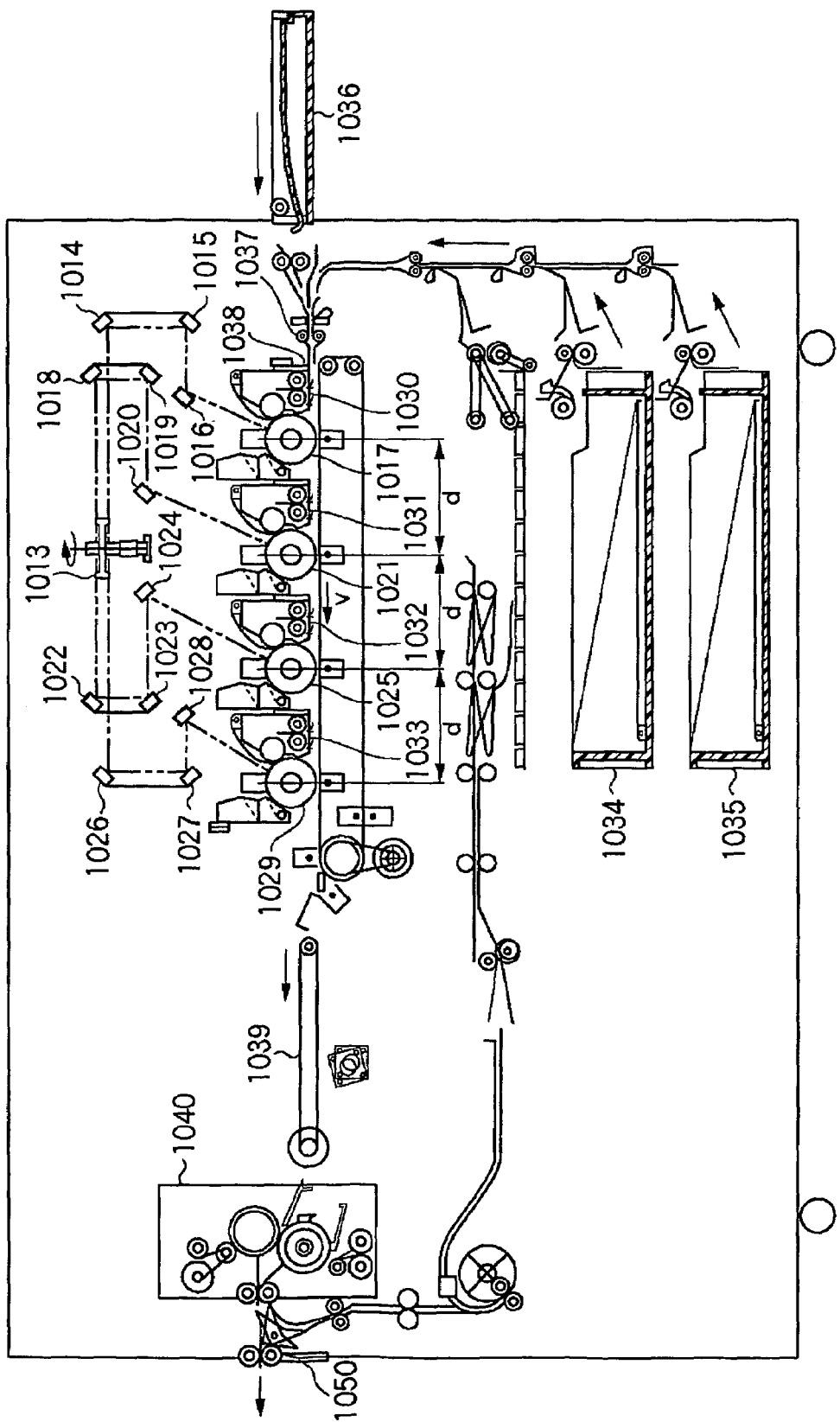
FIG. 2 is a main cross-sectional view showing a color image forming device according to the embodiment.

FIG. 2 is a side view of the color printer 101. In this drawing, reference numeral 1013 denotes a polygon mirror for receiving four laser beams emitted from four semiconductor lasers (C, M, Y, and K). The first laser beam of the four laser beams scans a photosensitive drum 1017 via mirrors 1014, 1015, and 1016. The second laser beam scans a photosensitive drum 1021 via mirrors 1018, 1019, and 1020. The third laser beam scans a photosensitive drum 1025 via mirrors 1022, 1023, and 1024. The fourth laser beam scans a photosensitive drum 1029 via mirrors 1026, 1027, and 1028.

Reference numeral 1030 denotes a developer for supplying yellow (Y) toner and forming a yellow toner image on the photosensitive drum 1017 in accordance with the laser beam. Reference numeral 1031 denotes a developer for supplying magenta (M) toner and forming a magenta toner image on the photosensitive drum 1021 in accordance with the laser beam. Reference numeral 1032 denotes a developer for supplying cyan (C) toner and forming a cyan image on the photosensitive drum 1025. Reference numeral 1033 denotes a developer for supplying black (Bk) toner and forming a black toner image on the photosensitive drum 1029.

In the above-mentioned manner, the toner images in the four colors (Y, M, C, and Bk) are transferred to a sheet as an output medium, thereby obtaining a full color output image.

A sheet fed from one of sheet cassettes 1034 and 1035 and a manual feed tray 1036 is conveyed via a registration roller 1037 to be attracted onto a transfer belt 1038. In synchronism with a timing of the sheet feeding, the respective color toner images are previously developed on the photosensitive drums 1017, 1021, 1025, and 1029. Then the respective color toner images are transferred to the corresponding sheets concurrently with the sheet feeding. The sheets having the respective color toner images thus transferred are separated from the transfer belt 1038 and conveyed by a conveyance belt 1039. The toner image is pressurized and heated by a fixer 1040 to be melted and fixed on the sheet. The sheet passing through the fixer 1040 is discharged to the outside of the device. Then, the sheet, after fixation, is once introduced downward by a flapper 1050, and after the trailing end of the sheet passes through the flapper 1050, the sheet can be switched back to turn over the sheet. As a result, each of the sheets can be discharged to the outside of the device with the face down and can also be reintroduce onto the transfer belt 1038 with the sheet reversed, thereby obtaining a double-sided print sheet. It should be noted that the four photosensitive drums 1017, 1021, 1025, and 1029 are arranged at even intervals by a distance d. The sheet is conveyed by the conveyance belt 1039 at a constant speed V, and the four semiconductor lasers are driven in synchronism with the sheet conveyance timing.

Example Configuration of the Monochrome Printer 102

Next, an example configuration of the monochrome printer 102 will be described with reference to FIG. 3.

Figure 3:
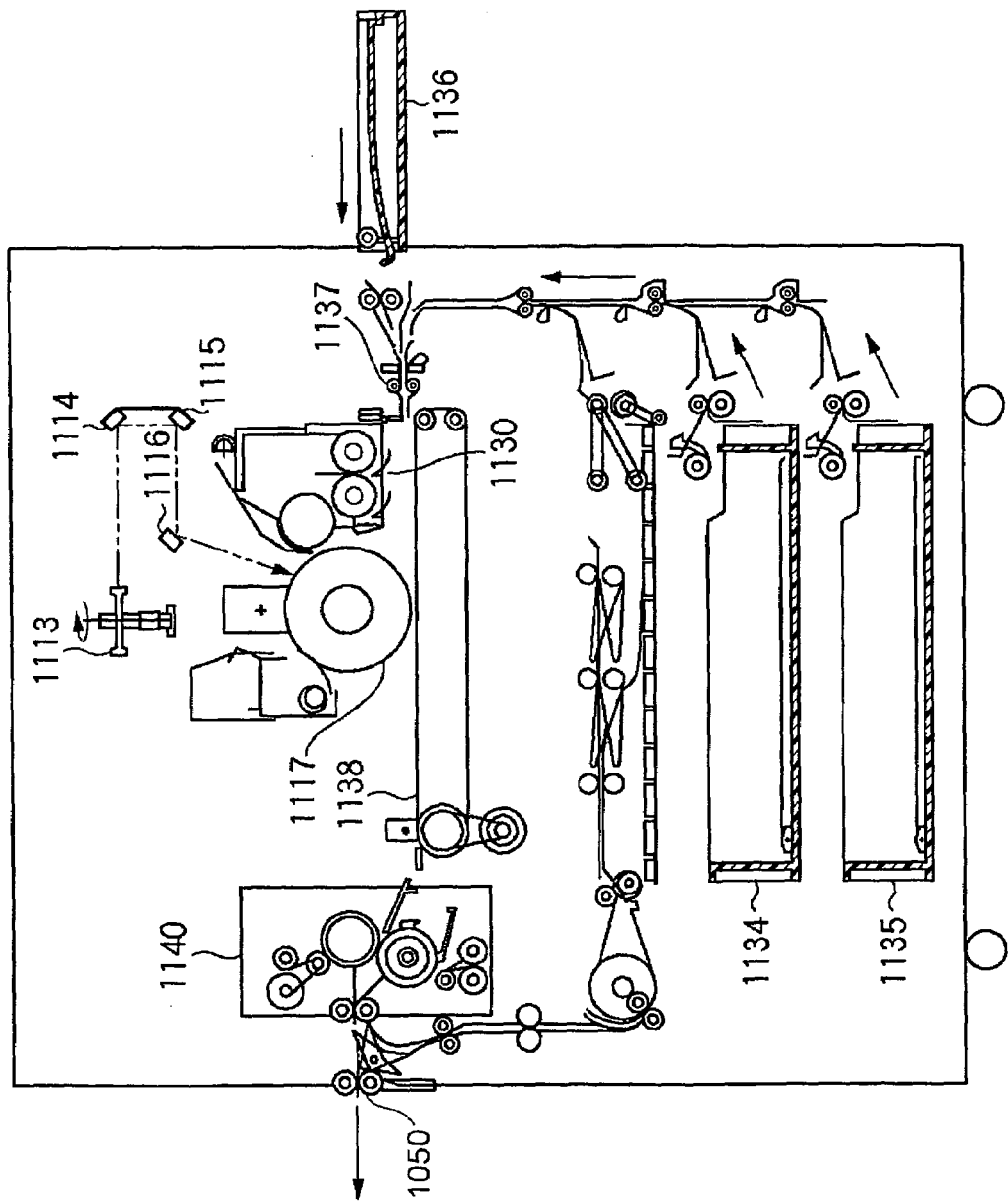
FIG. 3 is a main cross-sectional view showing a monochrome image forming device according to the embodiment.

FIG. 3 is a side view showing a configuration of the monochrome printer 102. In this drawing, reference numeral 1113 denotes a polygon mirror for deflecting a laser beam emitted from a semiconductor laser. This laser beam scans a photosensitive drum 1117 via mirrors 1114, 1115, and 1116. Reference numeral 1130 denotes a developer for supplying black toner and forming a black toner image on the photosensitive drum 1117. The toner image is transferred to the sheet, thereby making it possible to obtain an output image.

A sheet fed from one of sheet cassettes 1134 and 1135 and a manual feed tray 1136 is conveyed via a registration roller 1137 to be attracted onto a transfer belt 1138. In sync with a timing of the sheet feeding, the toner image is previously developed on the photosensitive drum 1117. The toner image is transferred onto the sheet concurrently with the sheet feeding. The sheet having the toner image thus transferred is separated from the transfer belt 1138. The toner image is pressurized and heated by a fixer 1140 to be melted and fixed on the sheet. The sheet passing through the fixer is discharged to the outside of the device. Then, the sheet after fixation is once introduced downward by the flapper 1050, and after the trailing end of the sheet passes through the flapper 1050, the sheet can be switched. As a result, each of the sheets can be discharged to the outside of the device with the face down and can also be reintroduce onto the transfer belt 1138 with the sheet reversed, thereby obtaining a double-sided print sheet.

Configuration Example of the RFID Tag Attachment Device 201

Figure 4:
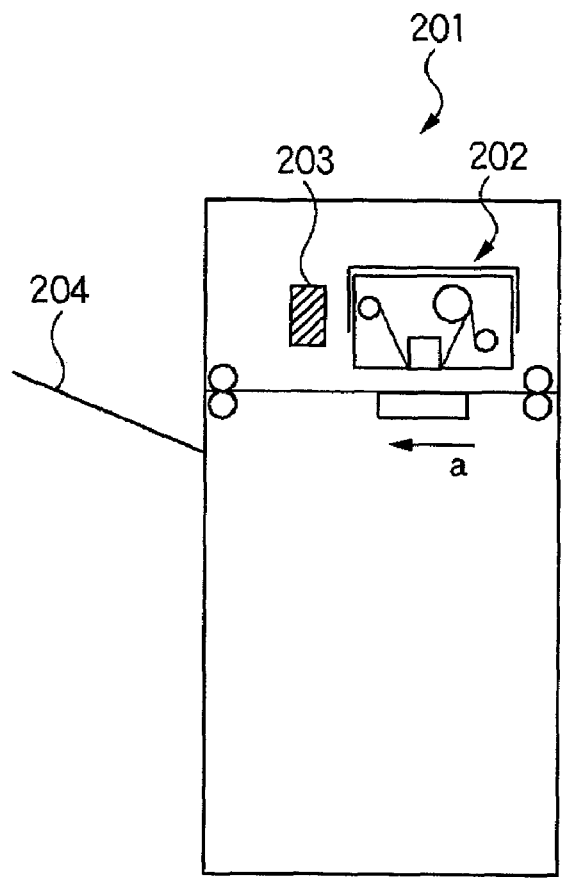
FIG. 4 is a main cross-sectional view showing an RFID tag attachment device according to the embodiment.

Next, a configuration example of the RFID tag attachment device 201 will be described with reference to FIG. 4. It should be noted that the RFID tag attachment device 201 is arranged at the downstream side of the printers 101 and 102. Herein, a description will be given of a case where the RFID tag attachment device 201 is arranged with the color printer 101.

The sheet having an image formed by the printer is conveyed in the direction of an arrow a, and a tag affixer 202 affixes an RFID tag on the sheet at a predetermined position. Then, a reader/writer 203 writes sheet attribute information in a memory section inside the RFID tag, and the sheet is discharged to a tray 204. It should be noted that the tag affixer 202 of FIG. 4 corresponds to the tag affixers 202-1 and 202-2 of FIG. 1, and the reader/writer 203 corresponds to the readers/writers 203-1 and 203-2.

Configuration Examples of the RFID Tag and the Tag Sheet

Figure 5:
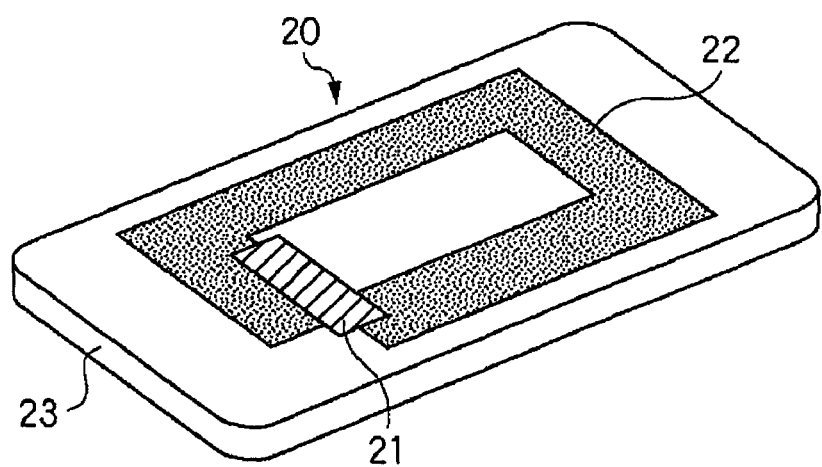
FIG. 5 is a detail view showing an RFID tag according to the embodiment.

Next, a configuration of an RFID tag will be described with reference to FIG. 5.

The RFID tag 20 has a flexible circuit substrate 23 having a plate shape and serving as a thin circuit substrate on which an antenna pattern 22 is formed, and a memory section 21 mounted thereon. Then, the RFID tag 20 is structured to be batteryless. From the antenna pattern 22 of the RFID tag 20, electromagnetic field coupling is achieved via a coil shaped antenna section 203a (refer to FIG. 6) provided to the reader/writer 203.

FIGS. 9A to 9D show detailed construction example of a tag sheet 221 adopted in this embodiment.

The tag sheet 221 is composed of a plurality of RFID tags 20 arranged on a base tape 222.

Figure 9A:
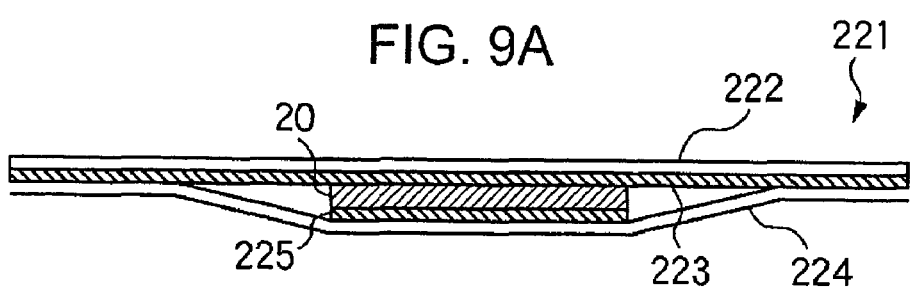
FIGS. 9A to 9D are detail views showing a tag sheet according to the embodiment.

As shown in FIG. 9A, an adhesive layer 223 is formed on the base tape 222. With the provision of the adhesive layer, the RFID tag 20 is temporally fixed on the base tape. Also, an adhesive layer 225 is formed on a surface of the RFID tag 20 on the opposite side of the base tape. A stripping tape 224 is temporally fixed by the adhesive layers 223 and 225 so as to cover the base tape 222 and the RFID tag 20.

Figure 9B:
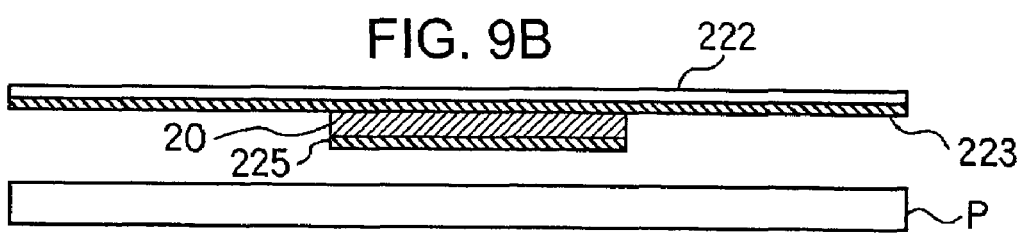

When the RFID tag 20 is affixed to a sheet P, the stripping tape 224 is peeled off as shown in FIG. 9B. The adhesiveness of the base tapes 222 of the adhesive layers 223 and 225 with respect to the RFID tag 20 is set higher than those with respect to the stripping tape 224, so only the stripping tape is peeled off from the tag sheet 221.

Figure 9C:
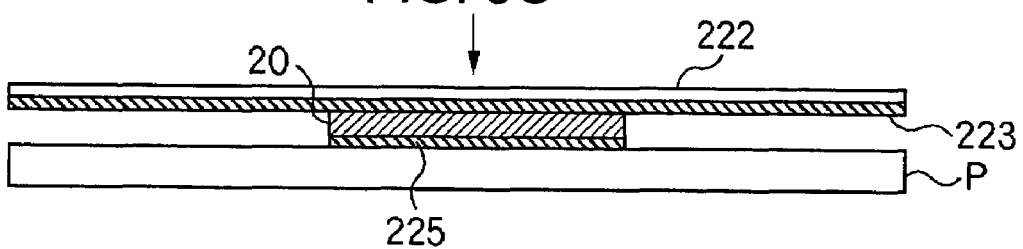

In this state, as shown in FIG. 9C, contact and pressurization are performed so that only the sheet P and the RFID side adhesive layer 225 are contacted with each other.

Figure 9D:
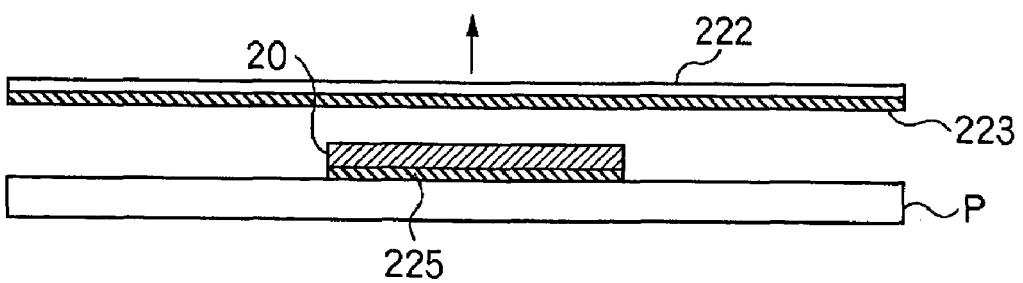

Next, as shown in FIG. 9D, when the tag sheet 221 is separated from the sheet P, the RFID tag 20 is peeled off from the tag sheet to be fixed to the sheet P.

Next, the detailed configurations of the tag affixer 202 and the reader/writer 203 will be described with reference to FIGS. 6 to 8.

Figure 6:
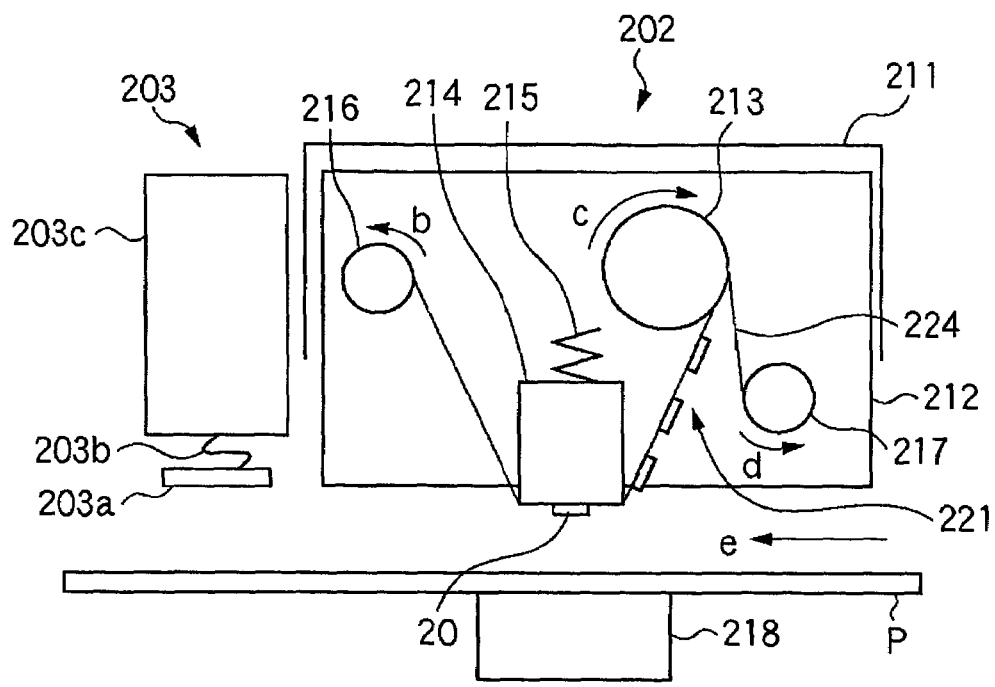
FIG. 6 is a detail view showing a tag affixer according to the embodiment.

As shown in FIG. 6, a tag sheet holding section 212 is supported movably in vertical directions by a guide 211 fixed to a main body of the RFID tag attachment device 201 and driven by an elevation unit not shown in the drawing. The tag sheet 221 is removed by the rotation in the direction of an arrow b from a tag sheet bobbin 213 to a base take-up collar 216. It should be noted that the tag sheet bobbin 213 and the base take-up collar 216 are rotatably supported by the tag sheet holding section 212. Furthermore, the tag sheet 221 is extended by an affixing head 214 that is biased to be movable in the vertical direction to the tag sheet holding section 212 by a head pressurizing member 215 so as to face the sheet P. Also, a stripping tape take-up collar 217 for taking up the tag sheet bobbin 213 and the stripping tape 224 of the tag sheet 221 is biased by a bias unit (not shown in the drawing) in the respective rotational directions of arrows c and d to operate in association with the head pressurizing member 215, thereby preventing looseness of the tag sheet 221.

Hereinafter, the operation of affixing the RFID tag 20 to the sheet P with the use of the tag sheet 221 by the tag affixer 202 will be described in sequence with reference to FIGS. 6 to 8.

As shown in FIG. 6, the sheet P is conveyed in the direction of an arrow e and then temporarily stopped at a predetermined RFID affixation position. The base take-up collar 216 is driven and fixed in position so that the RFID tag 20 on the tag sheet 221 locates at substantially the center of the affixing head 214.

At this time, the stripping tape 224 of the tag sheet 221 is peeled off from the RFID tag 20 by the stripping tape take-up collar 217, and the adhesive layer 225 of a RFID tag surface is exposed (in the state of FIG. 9B showing the detail of the tag sheet).

Figure 7:
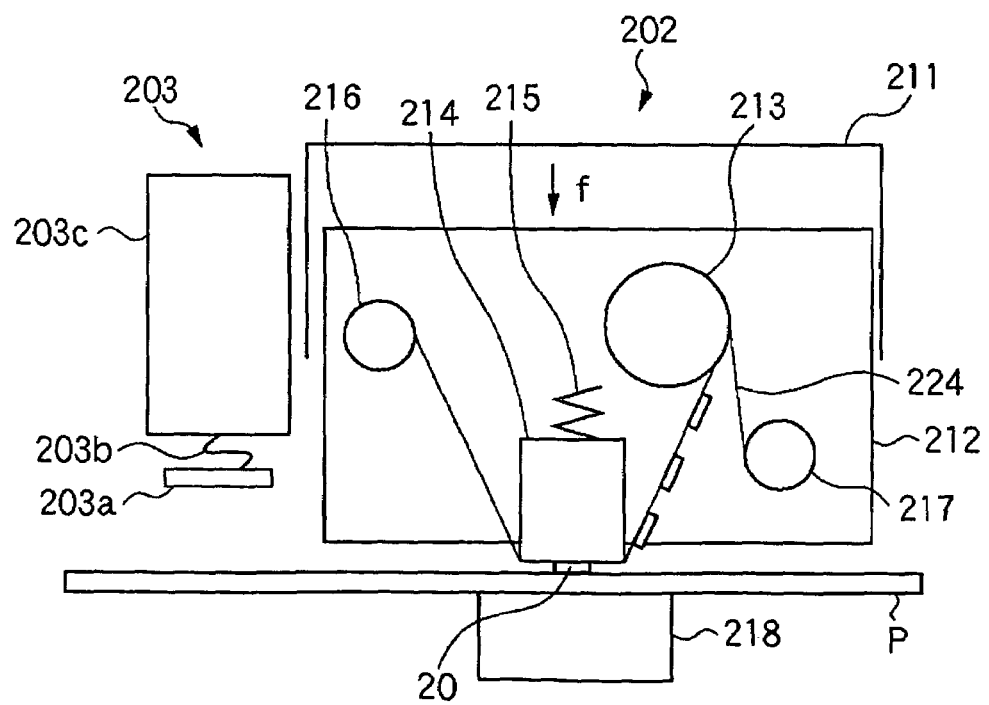
FIG. 7 is a detail view showing a tag affixer according to the embodiment.

Next, as shown in FIG. 7, the elevation unit (not shown) is driven to move the tag sheet holding section 212 in the direction of an arrow f. The RFID tag 20 contacts with and presses against the sheet P under the pressurizing force acted by the head pressurizing member 215 (in the state of FIG. 9C showing the detail of the tag sheet). At this time, a surface of the sheet P facing the affixing head 214 is supported by an affixing table 218 that is stably installed to the RFID tag attachment device 201.

Figure 8:
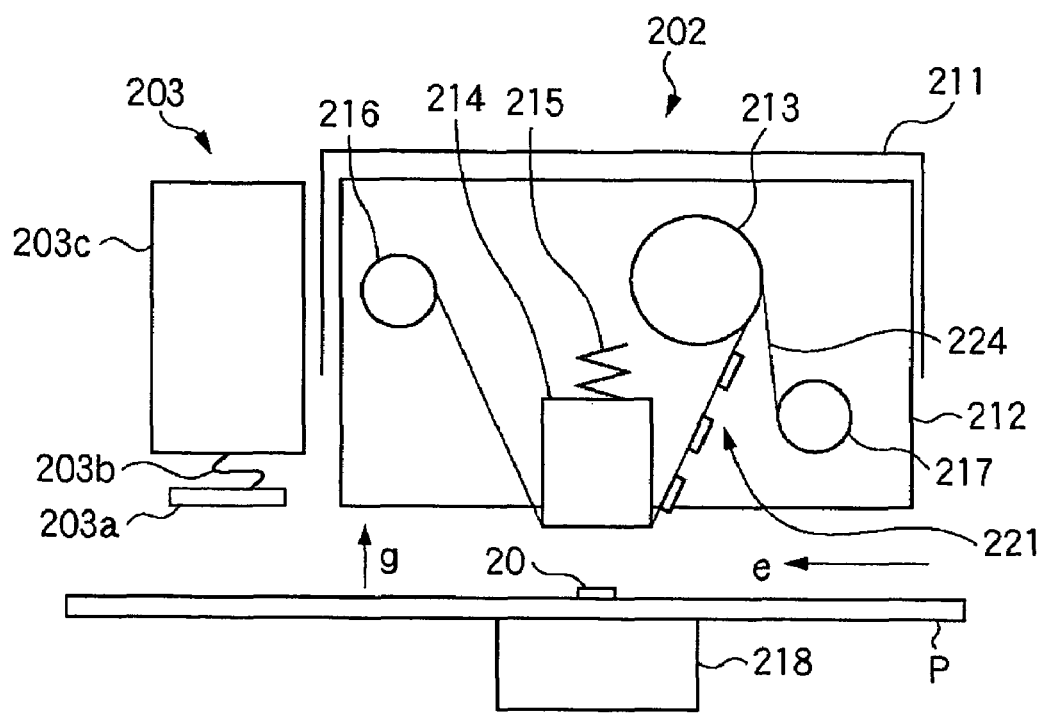
FIG. 8 is a detail view showing a tag affixer according to the embodiment.

Next, as shown in FIG. 8, the elevation unit (not shown) is driven to move the tag sheet holding section 212 in the direction of an arrow g, thereby separating the sheet P from the affixing head 214. At this time, the RFID tag 20 is peeled off from the tag sheet 221 to be fixed to the sheet P (in the state of FIG. 9D showing the detail of the tag sheet). With the above-mentioned operation, the RFID tag 20 is affixed to the sheet P by the tag affixer 202.

Next, the sheet P is conveyed again in the direction of the arrow e of FIG. 8. When the sheet P passes near the antenna section 203a of the reader/writer 203, sheet attribute information is written in the RFID tag 20.

The antenna section 203a is arranged in the reader/writer 203 for electromagnetically coupling the RFID tag and the reader/writer 203 with each other. A main body 203c of the reader/writer 203 is connected to the antenna section 203a and a wire harness 203b. It should be noted that the reader/writer 203 may be integrated with the antenna section 203a and positioned at the location of the antenna section 203a. Then, the sheet P is discharged onto the tray 204.

It should be noted that the control for the affixing process of the RFID tag 20 to the sheet will be described below.

Configuration Example of the Collator 103

Next, a configuration of the collator will be described with reference to FIG. 10.

Figure 10:
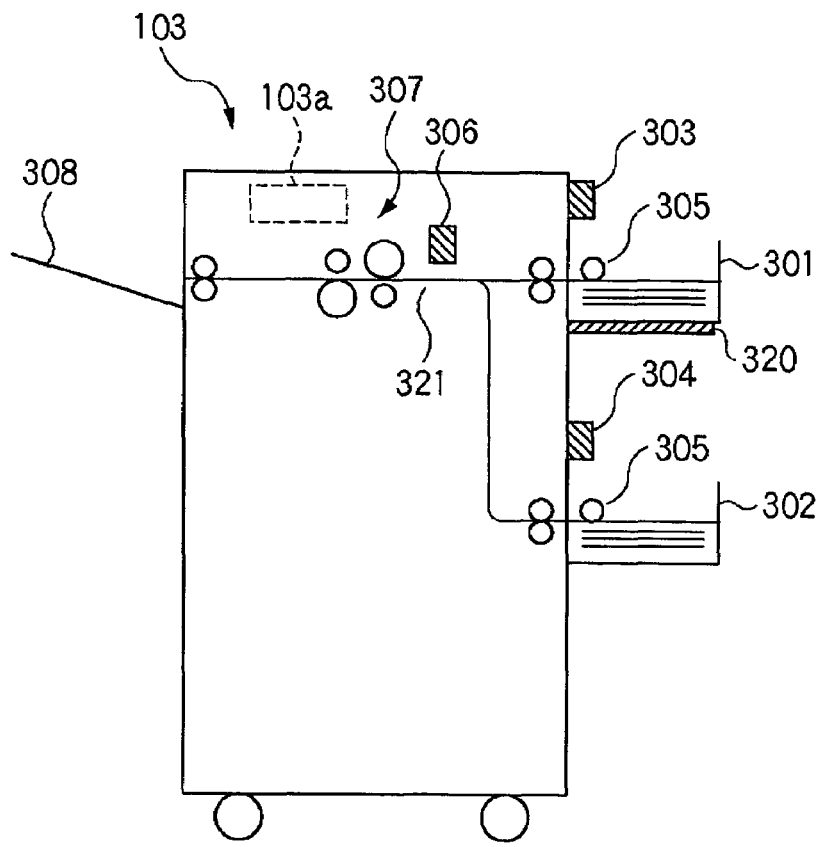
FIG. 10 is a main cross-sectional view showing a collator according to the embodiment.

FIG. 10 is a side view showing a schematic configuration example of the collator 103. The operation of the collator 103 is controlled by the control section 103a inside the collator.

The sheet bundles discharged from the color printer 101 and the monochrome printer 102 are set to sheet feed trays 301 and 302, respectively. The readers/writers 303 and 304 are arranged close to the sheet feed trays 301 and 302, and sheet attribute information is read for every sheet bundle. It should be noted that the readers/writers 303 and 304 have the same configurations as the reader/writer 203. Also, the readers/writers 303 and 304 may be used for reading only, and the reader/writer 203 may be used for writing only.

Although the readers/writers 303 and 304 are arranged in the upper portions of the respective sheet feed trays 301 and 302 in the configuration of FIG. 10, when the sheet feed trays are made of resin, the readers/writers 303 and 304 may arranged near the lower portion of the sheet feed trays. Also, when the sheet feed tray 301 is adjacent to the sheet feed tray 302, in some cases, the reader/writer 303 erroneously reads the sheet bundle information on the sheet feed tray 302. In such cases, as shown in FIG. 10, by arranging a metal shield plate 320, which can be a magnetic substance, in the lower portion of the sheet feed tray 301, electromagnetic waves are interrupted, whereby communication with the corresponding sheet bundle can be realized. It should be noted that in the first operational example, the RFID tags are attached to all the sheets. In this case, the readers/writers 303 and 304 read the image formation specific information from the RFID tag attached to the uppermost sheet of the sheet bundle of each tray.

On the other hand, in the second operational example, the RFID tag is attached only to a sheet on which warp correction, which will be described below, should be performed. Therefore, the readers/writers 303 and 304 read the job information from the RFID tag attached to one of the sheets in the sheet bundle of each tray.

In the case of the first operational example, the sheets on the sheet feed tray 301 (sheets on which the color images have been formed) and the sheets on the sheet feed tray 302 (sheets on which the monochrome images have been formed) are selectively fed by a sheet feed roller 305 so that the page order is accurate based on the read attribute information.

Midway during conveying the sheet through a path 321 inside the device, the information written in the RFID tag for every sheet is individually read by the reader/writer 306. On the basis of the read information, warp is corrected for every sheet by controlling a warp correction unit 307, and the sheet is discharged onto a main tray 308. Also, the reader/writer 306 writes a history indicating that the sheet has been processed by the collator 103 in the RFID tag on the sheet. It should be noted that the reader/writer 306 has the same configuration as the reader/writer 203.

Figure 11:
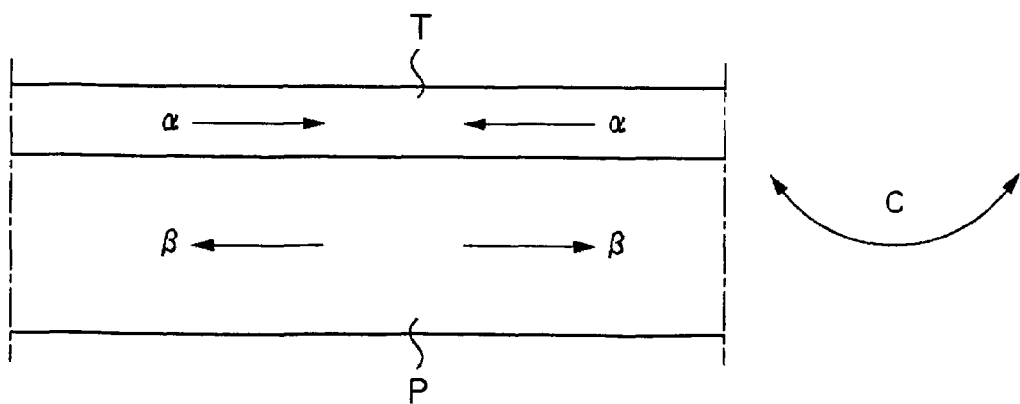
FIG. 11 is a schematic diagram for describing a warp generated due to toner on a sheet.

Next, a description will be given of the warp correction unit 307 with reference to FIGS. 11, 12A, and 12B.

The sheet output from the printer may have degraded planarity. Causes for the planarity degradation of the sheet P are considered as follows. When the sheet P is heated by the fixer of the printer, the toner on the sheet P is melted, and at the same time, moisture contained in the sheet P evaporates. FIG. 11 shows a schematic diagram of the toner and the sheet P after having passed through the fixer and discharged from the printer.

The sheet P and the toner T immediately after passing through the fixer are high in temperature, but while the sheet is being discharged or left on the tray as it is, the heat will be released into the environment. Thus, the temperatures of the sheet P and the toner T will be reduced. At this time, the toner T is coagulated from the melted state and shrinks in the direction of an arrow α. Also, the sheet P absorbs moisture in the environment, and therefor expands in the direction of an arrow β. As a result, similarly to the case of a bimetal, as shown in an arrow C, the sheet P involves a warp to cause a toner image printed surface to be concave upward.

The above-mentioned description applies to the case where the toner T is on the upper side of the sheet P in the drawing, but when the lower side of the sheet P has the toner T, the warp direction becomes a direction C. Also, when the toner T is present on the upper and lower sides of the sheet P, the warp direction varies depending on the thickness difference between these toner layers. That is, if the toner layer on the upper side is thicker than that on the lower side, the shrinkage amount on the upper side becomes large and the warp is generated in the direction C in FIG. 11. In order that the collator 103 performs high quality collation, it is necessary to prepare the warp correction unit for correcting the warp in both directions as described above.

FIGS. 12A and 12B show a detailed configuration example of the warp correcting unit.

The warp correction unit 307 is composed of two sets of roller pairs. Hard rollers 331 and 334 are driven rollers, and front surfaces thereof are made of a hard material such as a metal or resin. Also, the hard rollers 331 and 334 are constructed movable in the vertical direction. Then, soft rollers 332 and 333 facing the hard rollers 331 and 334 are pressed against or separated from the hard rollers 331 and 334 by a pressurization unit not shown in the drawing. Furthermore, in the configuration, the pressurization force is set variable by the pressurization unit. The soft rollers 332 and 333 are rotated and driven by a driving source not shown in the drawing, and front surfaces thereof are made of a soft material such as rubber or sponge. The soft rollers 332 and 333 have a larger diameter than the hard rollers 331 and 334. The roller pair 331 and 332 and the roller pair 333 and 334 are arranged to be opposite in the relative positional relation as in FIGS. 12A and 12B.

The above operation of the warp correction unit is described in detail as follows.

In the case of a sheet having an upwardly convex warp as shown in FIG. 12A, the hard roller 331 of the upstream side roller pair is pressed and operated by a pressurization mechanism in the direction of an arrow g. Then, a downwardly convex nip 332a is formed at a nip portion of the roller pair, which is the opposite direction to the sheet warp direction. On the other hand, the downstream side roller pairs 333 and 334 are in a separated state from each other. By rotating and driving the soft roller 332, the sheet having the upwardly convex warp passes within the warp correction unit. As a result, elasticity is applied to the warp direction and the opposite direction as described above, whereby the warp of the sheet is corrected and the sheet surface becomes flat.

In the case of a sheet having a downwardly convex warp as shown in FIG. 12B, the hard roller 334 of the downstream side roller pair is pressed and operated in the direction of an arrow h. Then, an upwardly convex nip 333a is formed at a nip portion of the roller pair, which is the opposite direction to the sheet warp direction. On the other hand, the downstream side roller pairs 331 and 332 are separated from each other. By rotating and driving the soft roller 333, the sheet having the downwardly convex warp passes within the warp correction unit. As a result, elasticity is applied to the warp direction and the opposite direction as described above, whereby the warp of the sheet is corrected and the sheet surface becomes flat.

The adjustment of the elasticity application can be varied by changing the pressurizing force of the pressurization mechanism. This adjustment amount may be determined on the basis of the result of measurement for the actual sheet warp amount, but the adjustment amount is predicted in this example on the basis of the sheet attribute information of the RFID tag that is attached to the sheet.

When the sheet is cooled down, the sheet warp amount varies in accordance with the temperature change of the sheet. The temperature of the sheet is lowered over time, but the lowering degree varies depending on conditions such as the specific heat of the sheet type and the thickness of the toner layer T (that is, the printing density). Also, the elasticity of the sheet itself, that is, Young's modulus of the sheet type, and the thickness of the toner layer T also causes the change in the temperature of the sheet, and accordingly the warp amount changes as well. Therefore, regarding the prediction of the sheet warp amount, it is possible to accurately predict the warp amount on the basis of the image formation specific information for each sheet such as the elapsed time from the sheet output from the printer to the warp correction in the collator, the sheet type, the printing density, and the mode of single-sided printing or double-sided printing.

The sheet having passed the warp correction unit 307 is discharged onto the tray 308.

It should be noted that the collator 103 has the readers/writers (303, 304, and 306) at three positions, but the reader/writer main body may not necessarily be individually installed. In other words, the above-mentioned three positions have only antenna sections and are connected to one reader/writer main body via the wire harness.

Configuration Example of the Case Binding Machine 104

Figure 13:
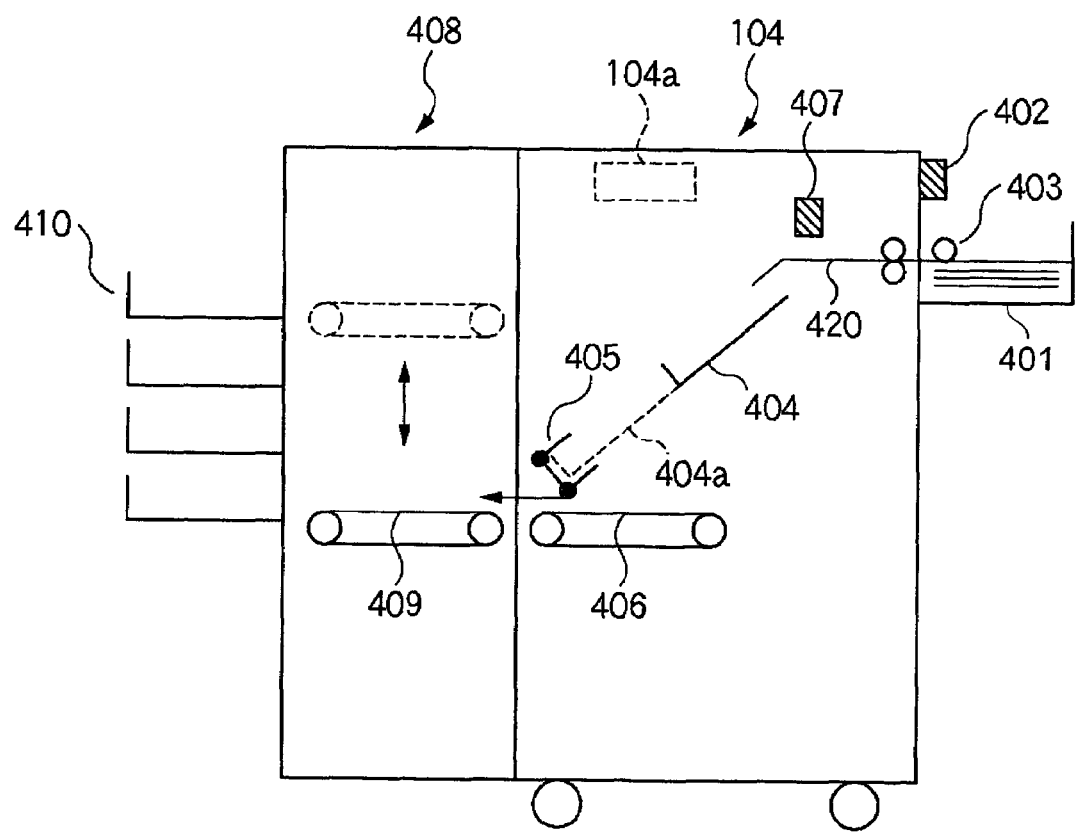
FIG. 13 is a main cross-sectional view showing a case binding machine according to the embodiment.

Next, a configuration of the case binding machine will be described with reference to FIG. 13. FIG. 13 is a side view showing a schematic construction of the case binding machine 104. The operation of the case binding machine 104 is controlled by the control section 104a inside the case binding machine.

The sheet bundle discharged from the collator 103 is set to a sheet feed tray 401. In the vicinity of the sheet feed tray 401, the reader/writer 402 is arranged. The reader/writer 402 reads the sheet attribute information written in the RFID tag attached to the sheet in the set sheet bundle. The book binding process is performed on the basis of the read information.

Midway in conveying the sheet in a path 420 inside the device, the reader/writer 407 deletes the print attribute information stored in the RFID tag attached to the sheet. The attribute information is deleted because, if the print attribute information is not deleted upon reuse of the RFID tag, reading and writing errors at the time of reading and writing may be induced in distribution control for the bound final products or the like.

After the sheet bundle ends of the sheets necessary for binding one book are aligned by an alignment tray 404, the sheet bundle is transferred to a position represented by 404a. Thereafter, the binding tape preheated by a tape heating unit 405 abuts the end part of the sheet bundle, and the adhesive applied to the binding tape leaks in between the sheets of the sheet bundle, thereby gluing the sheet bundle. The glued sheet bundle is transferred to an elevator section 408 by a conveyance unit 406 having for example an endless belt shape. The sheet bundle shifted to the elevator section 408 is discharged to a predetermined location among a plurality of storage trays 410 via a vertically movable elevation and conveyance unit 409 having for example an endless belt shape.

It should be noted that the case binding machine has the readers/writers (402 and 407) at two positions, but the reader/writer main body may not necessarily be individually installed. In other words, only the antenna portions are arranged at the above-mentioned two positions and may be connected to one reader/writer main body via the wire harness. Herein, the reader/writer 402 may be used for reading only, and the reader/writer 407 may be used for writing only or deletion only.

Configuration Example of the Finisher 105

Figure 14:
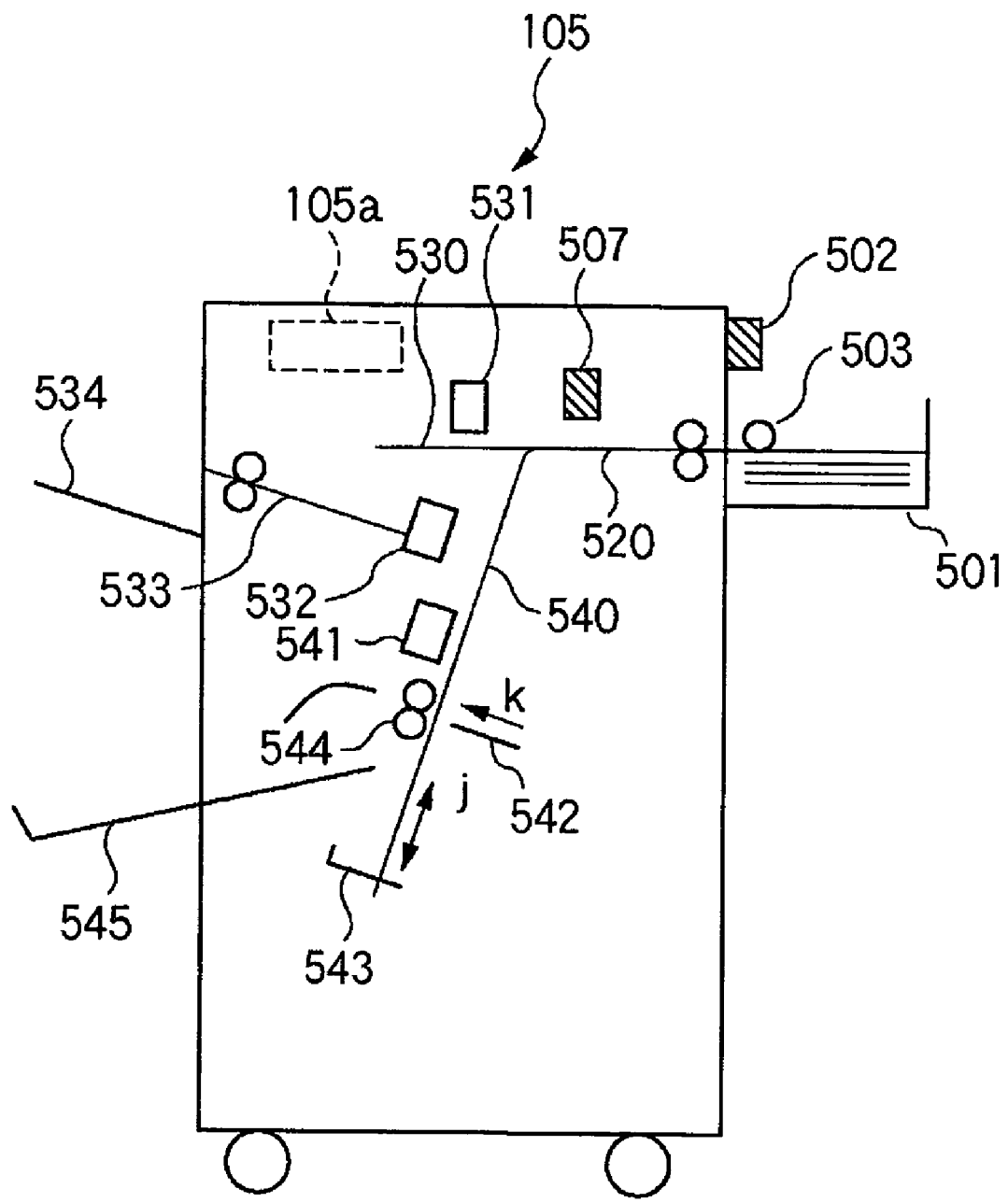
FIG. 14 is a main cross-sectional view showing a finisher according to the embodiment.

Next, a configuration of the finisher will be described with reference to FIG. 14. FIG. 14 is a side view showing a schematic configuration of the finisher 105. The operation of the finisher 105 is controlled by the control section 105a inside the finisher.

The finisher aligns the taken sheets to stack into one sheet bundle. Thereafter, on the basis of the sheet attribute information, there is executed a staple process for stapling a spot near the end part of the sheet bundle (fastening process), a punching process for punching a spot near the end part of the sheet bundle, or the saddle stitching binding process for performing folding and stapling the sheet bundle in the center.

The sheet bundle discharged from the collator 103 is set to a sheet feed tray 501. In the vicinity of the sheet feed tray 501, the reader/writer 502 is arranged. The reader/writer 502 reads the sheet attribute information written in the RFID tag attached to the sheet in the set sheet bundle. The sheet is fed from the sheet feed tray 501 on the basis of the read information, and then the book binding process is performed.

Midway in conveying the sheet in a path 520 inside the device, the reader/writer 507 deletes the print attribute information stored in the RFID tag attached to the sheet. The reason for the deletion is as described above.

The main path 520 branches at the downstream into a finisher path 530 and a book binding path 540.

The sheets introduced to the finisher path 530 are punched at a spot near the sheet end part by a punch unit 531 when necessary and then placed on an intermediate tray 533. The sheet bundle placed on the intermediate tray 533 is subjected to the aligning process and the stapling process by a stapler 532. Thereafter, the sheet bundle is discharged onto a first storage tray 534.

On the other hand, the sheets introduced to the book binding path 540 are sequentially conveyed to a sheet positioning member 543 movable in the direction of an arrow j. While the leading end of the sheet bundle abuts the sheet positioning member 543, a stapler 541 staples the sheet bundle at the center position. Next, the sheet positioning member 543 is positioned so that the center of the sheet bundle locates at the position of the folding roller pair 544. In that state, an extrusion member 542 extrudes in the direction of an arrow k, whereby the sheet bundle is pushed in between the folding roller pair 544. With the rotation of the folding roller pair 544 in the pushing direction, the sheet bundle is folded. The folded sheet bundle is discharged onto a second storage tray 545.

It should be noted that the finisher has the readers/writers (502 and 507) at two positions, but the reader/writer main bodies may not necessary be individually installed. In other words, the above-mentioned two positions have only antenna sections and are connected to one reader/writer main body via the wire harness. Herein, the reader/writer 502 may be used for reading only, and the reader/writer 507 may be used for writing only or for deletion only.

Figure 15:
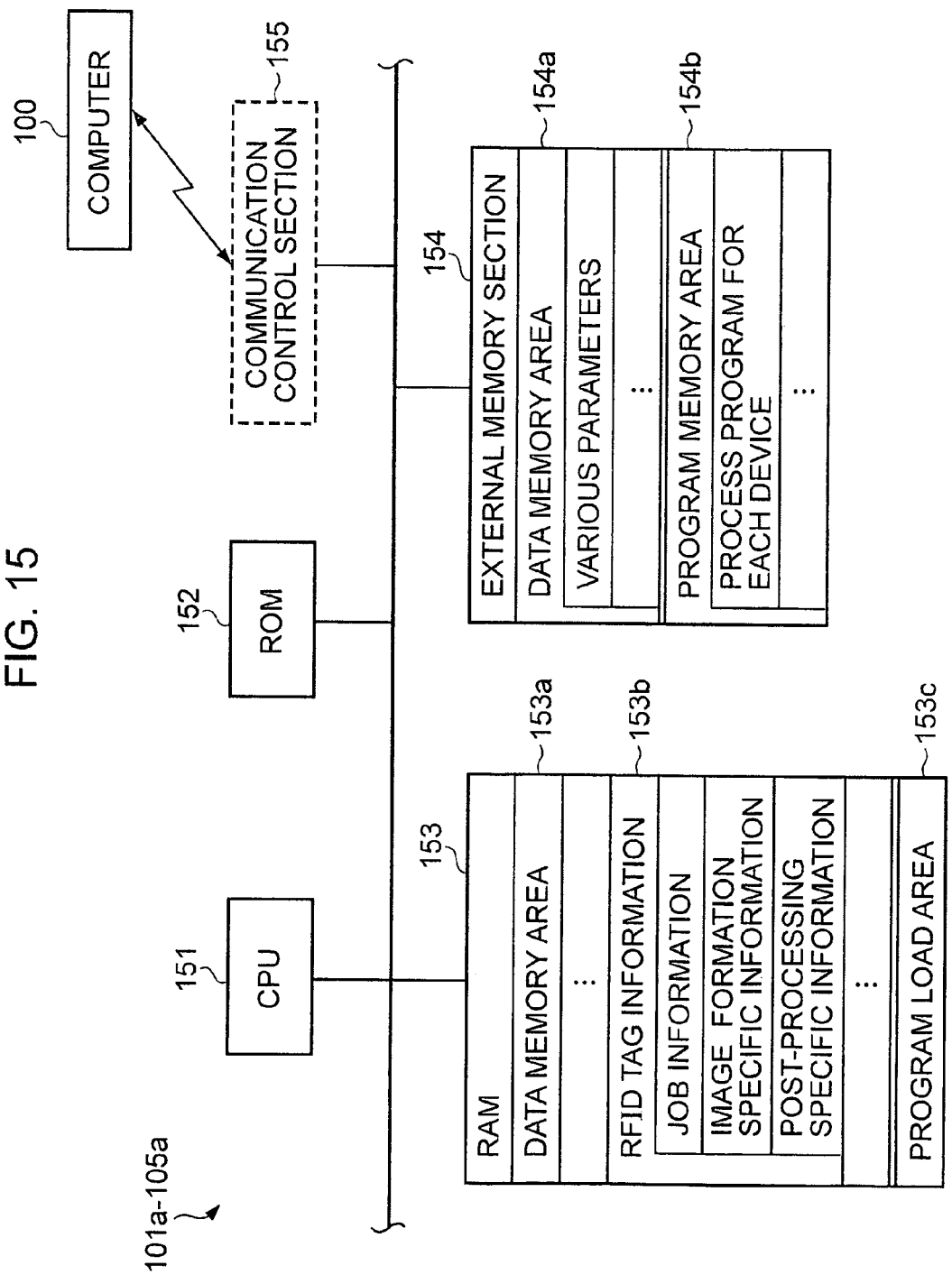
FIG. 15 is a block diagram showing a control section of the respective devices according to the embodiment.
Figure 16:
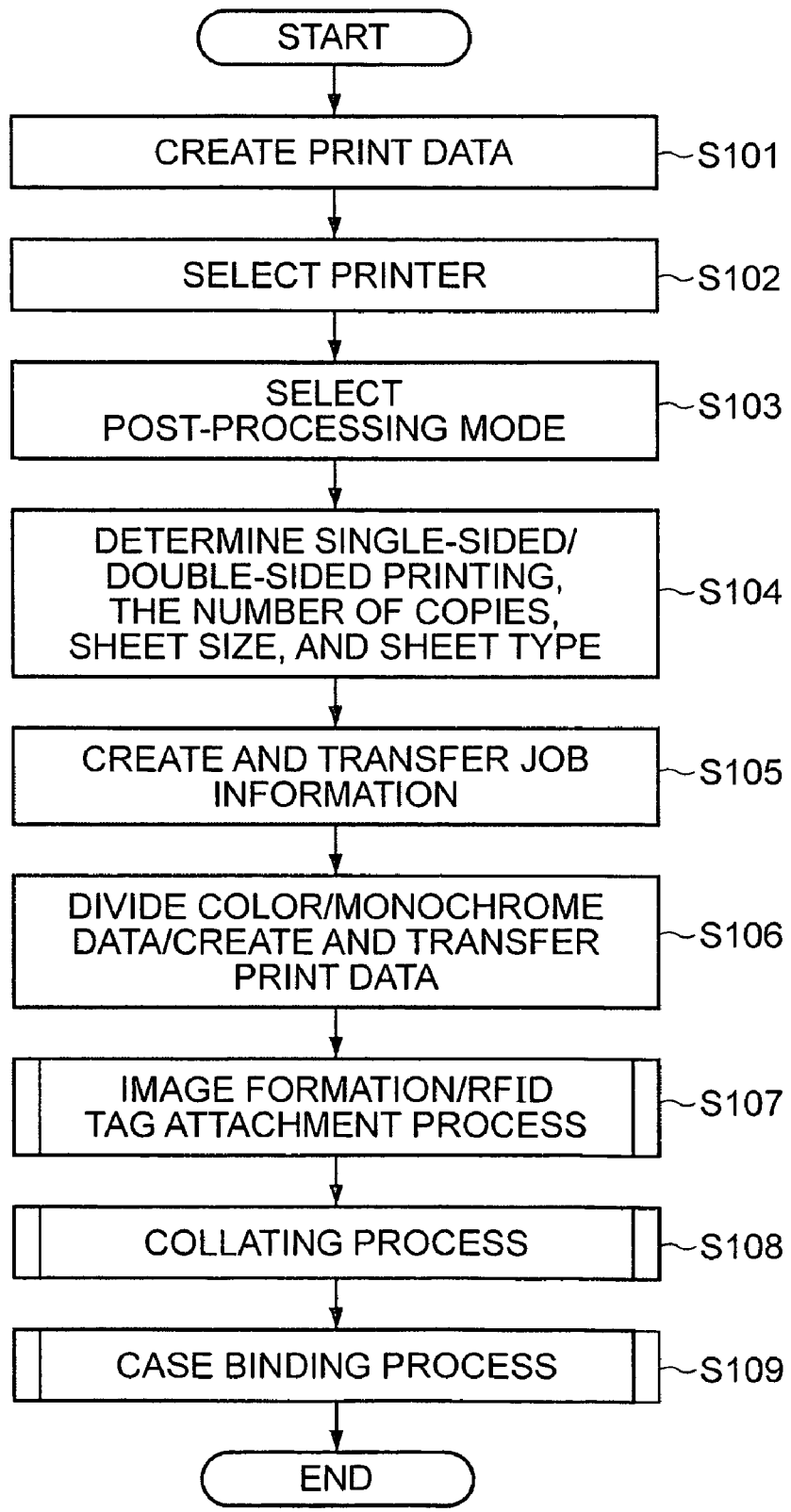
FIG. 16 is a flowchart for describing an operation of the image forming system according to the embodiment.

Configuration Examples of the Control Sections 101a and 105a according to this Embodiment FIG. 15 shows schematic configurations of the control sections 101a to 105a in the image forming system according to this embodiment.

Reference numeral 151 denotes a controlling CPU, reference numeral 152 denotes a ROM for storing fixed parameters and programs, and reference numeral 153 denotes a RAM used by the CPU 151 for temporal storage or for a load area of the programs. The RAM 153 includes a data memory area 153a and a program load area 153c. The data memory area 153a stores RFID tag information 153b particular to this embodiment. The RFID tag information 153b is information that is written to the RFID tag attached to the sheet or read from the RFID tag. The RFID tag information 153b includes the job information sent from the computer 100, the image formation specific information written after the image formation, and the post-processing specific information written on the basis of the content of the thus set post processing.

Reference numeral 154 denotes an external storage section such as a hard disk drive. A data memory area 154a stores parameters particular to the respective devices, and a program storage area 154b stores programs to be executed by the respective devices. Reference numeral 155 denotes a communication control section for controlling communication with the computer 100. The communication control section 155 is essential at least to the control sections 101a and 102a of the printers 101 and 102. Then, the communication control section 155 is optionally prepared for the post-processing devices 103 to 105 when all the systems are controlled by the computer 100.

The First Operational Example of the Image Forming System According to this Embodiment With reference to FIG. 1, 16 to FIGS. 22A, 22B, and 22C, the first operational example of the image forming system will be described.

Figure 22C:
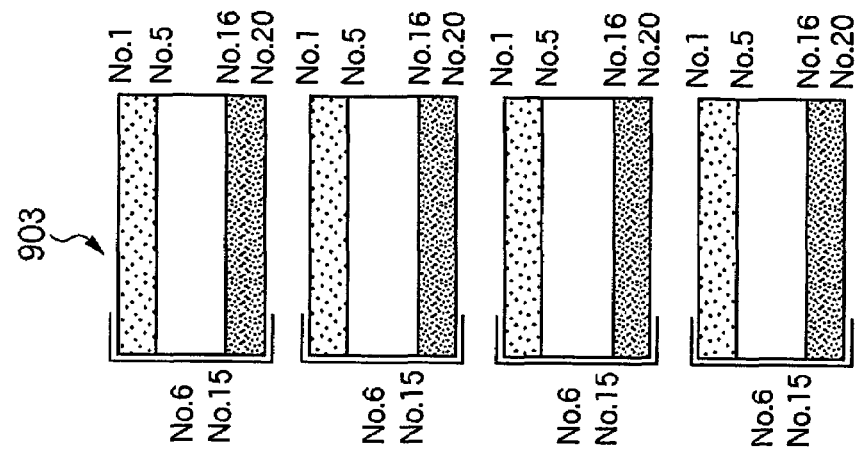
FIGS. 22A, 22B, and 22C are schematic diagrams showing sheet bundle form after the respective processes according to the embodiment.
Figure 22B:
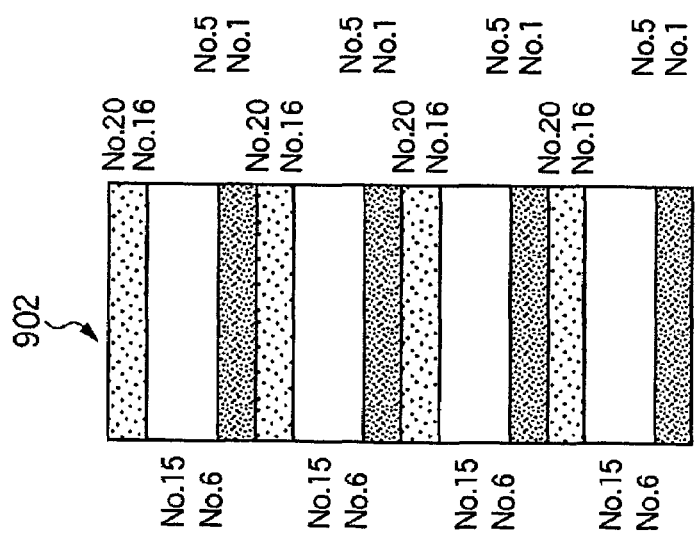
Figure 22A:
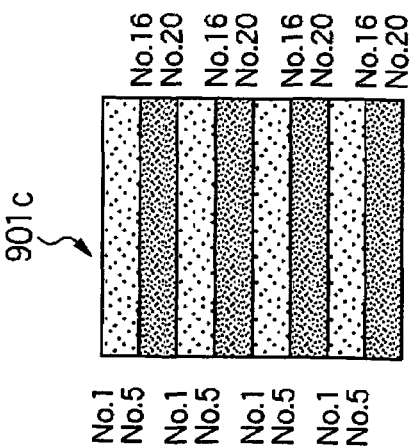

FIGS. 16 to 20 are flowcharts showing the first operational example of the printing and post processing operations in the image processing system according to this embodiment. Also, FIGS. 21A, 21B, and 21C show sheet attribute information. FIGS. 21A, 21B, and 21C respectively show the contents of the job information, the image formation specific information, and the post-processing specific information. FIGS. 22A, 22B, and 22C are drawings describing examples of the sheet processing. In this description, the case binding shown in FIG. 22C is represented as an example for the final products in the sheet processing.

The book binding job in this example is composed of 20 sheets with double-sided printing of 40 pages for one book. In this job, the first 5 sheets (No. 1 to No. 5 shown in the drawing) and the last 5 sheets (No. 16 to No. 20 shown in the drawing) are printed in color. The in-between 10 sheets (No. 6 to No. 15 shown in the drawing) are printed in monochrome. The number of copies is 4.

First of all, in Step S101, the operator uses a terminal of the computer 100 to create data of color and monochrome mixed originals with a known DTP software or the like. In Step S102, printers to be used among a plurality of printers connected on the network 100a are determined. In this example, in order that the color and monochrome mixed originals are printed separately by the color printer and the monochrome printer, the color printer 101 and the monochrome printer 102 are selected. It should be noted that since it is not the feature of the present invention, the selection of the printers is not described in detail. The operator may manually select the printers from the computer 100 or the computer 100 may automatically select the printers on the basis of the job content.

In Step S103, the post-processing mode is determined. In this example, the case binding process is selected as the mode of the final products. In Step S104, the selection of the single-sided printing or the double-sided printing, the number of printing copies, and the printing sheet size and type are determined. In this example, the double-sided printing is performed, the number of copies is 4, the printing sheet size is A4, and the sheet type is plain paper. This selection may also be manually performed individually by the operator from the computer 100 or automatically made by the computer 100 on the basis of specification of the entire job content.

In Step S105, by commanding the job start on the computer 100, the job information (refer to FIGS. 21A, 21B, and 21C) is created and transferred to memories inside the control sections 101*a* and 102*a* of the respective printers (the RAM 153 of FIG. 15; not individually shown in the drawing).

FIG. 21A shows the content of the job information. The job information is creased as described below on the basis of the input information of Step S104 and previous steps.

Each job has a "job ID" 601 for job identification given from the computer 100. A "total page number" 602 is judged on the basis of the information determined in Step S101. In this example, the total page number is 40. Also, "double-sided/single-sided printing" (whether the print mode is the double-sided printing or the single-sided printing) 603, the "number of copies" and "total sheet number" 605, "sheet type and size" 606 are already determined in Step S104. Also, a "color printing sheet No." (indicating which sheet should be output from the color printer) 604 is judged on the basis of these items and the selection of the color printer in Step S102. In this example, the color printing sheets are Nos. 1 to 5 and Nos. 16 to 20.

On the basis of the above-mentioned information and the "case binding process" selection determined in Step S103, "collating or not/post-processing order", "stapling or not/post-processing order", "saddle stitching or not/post-processing order" and "case binding or not/post-processing order" 607 are determined. That is, because the data of color and monochrome mixed originals is individually printed by the color printer and the monochrome printer, the flow of the post processings first follows the collating process by the collator 103 and then the case binding process. Therefore, in this example, "collating or not/post-processing order" is set as "1", the use of the collator 103 is declared, and further it is clarified that collating is the first post processing to be executed. "Stapling or not/post-processing order" and "saddle stitching or not/post-processing order" are not used and accordingly set as "0". "Case binding or not/post-processing order" is set as "2", the use of the case binding machine is declared, and further it is clarified that the case binding is the second post processing to be executed.

In Step S106, the data of the color sheets and the data of the monochrome sheets are respectively divided and transferred into the color printer 101 and the monochrome printer 102. In Step S107, image formation is performed by the respective printers, and the RFID tag attachment process is performed on the sheet. The color printer 101 performs printing in the descending order from the final sheet No. 20 to No. 16 for the color printing in FIGS. 22A, 22B, and 22C. As a result, the sheet bundle 901*c* shown in FIG. 22A is placed on the main tray 204 of FIG. 4. Similarly, the monochrome printer 102 performs the printing in the descending order from the final sheet No. 15 to No. 6 for the monochrome printing. As a result, the sheet bundle 901*bk* shown in FIG. 22A is placed on the main tray 204 of FIG. 4.

In Step S108, the collating process is performed as in the following manner. The operator sets the sheet bundles 901*c* and 901*bk* placed on the respective main trays of the printers 101 and 102 to the sheet feed trays 301 and 302 of the collator 103 shown in FIG. 10 without changing the page orders and the directions. After the setting is completed, the operator inputs the process start instruction from the operation section of the collator 103. As a result, the collated sheet bundle 902 as shown in FIG. 22B is placed on the main tray 308 of the collator 103.

In Step S109, the case binding process is conducted as follows. The operator sets the sheet bundle 902 placed on the main tray 308 of the collator 103 to the sheet feed tray 401 of the case binding machine 104 shown in FIG. 13 without changing the page orders and the directions. After the setting is completed, the operator inputs the process start instruction from the operation section of the case binding machine 104. As a result, the bound final products as shown in FIG. 22C are discharged on the storage tray 410 of the case binding machine 104.

Hereinafter, detailed operations of Step S107 (the image formation and RFID tag attachment process), Step S108 (the collating process), Step S109 (the case binding process), and the finisher process (which is not used in this example) will be described with reference to FIGS. 17 to 20.

Image Formation and RFID Tag Attachment Process Example 1: Step S107

Figure 17:
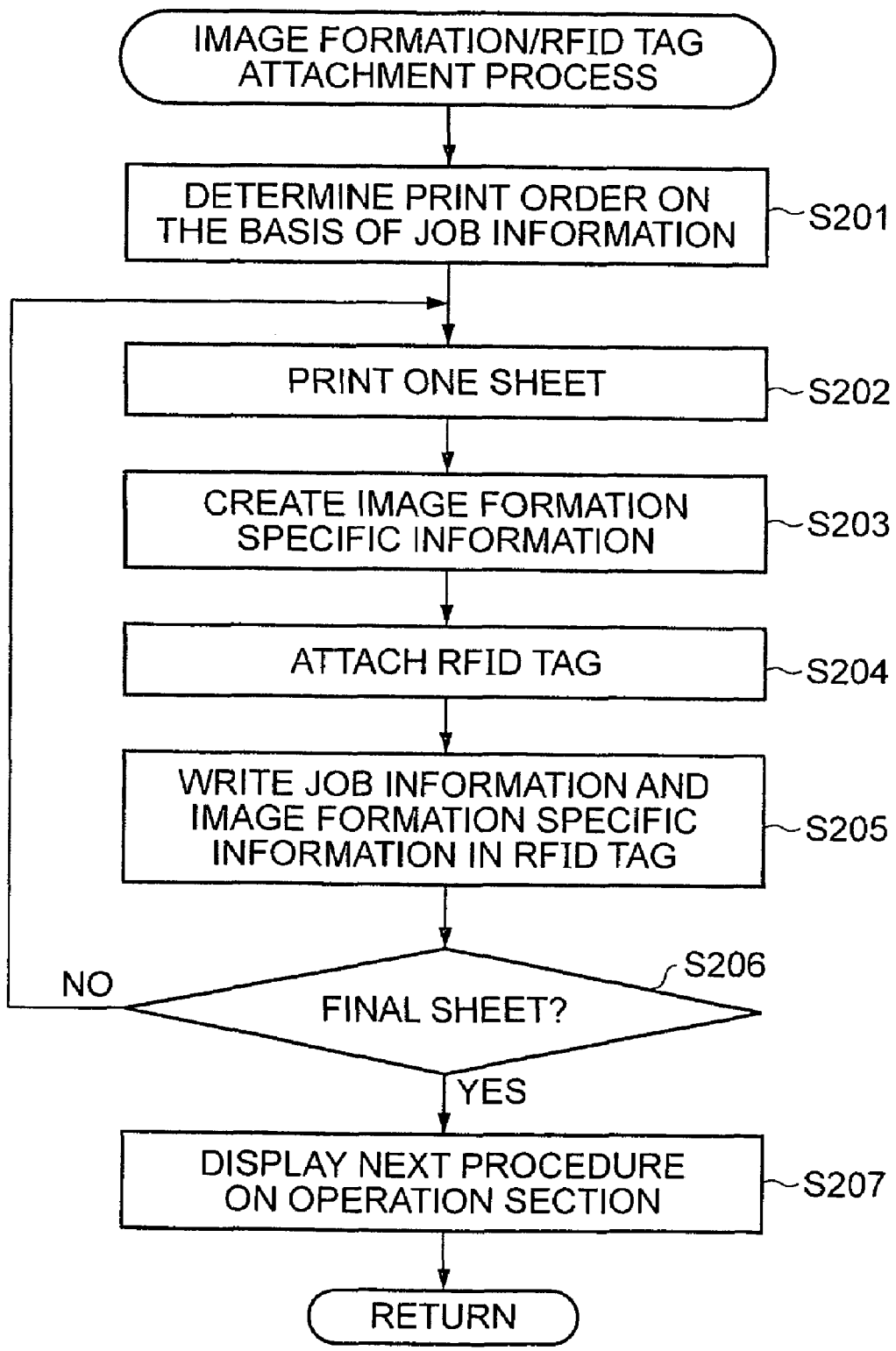
FIG. 17 is a flowchart of a sub routine for describing a first operation of image formation and RFID tag affixation according to the embodiment.

FIG. 17 is a flowchart showing a subroutine of Step S107 (the image formation and RFID tag attachment process).

In Step S201, on the basis of the job information stored in the memories in the control sections 101*a* and 102*a* of the respective printers, the printing order of the data by the respective printers in this job is determined, and in Step S202, the image formation for the first sheet is performed. In Step S203, the image formation specific information is created in the memory. The image formation specific information is information particular to each sheet, and FIG. 21B shows the content.

First of all, an "image formation time" 701 is recorded. A "sheet No." 702 is an identification number uniquely allocated to each sheet in the final products for one book, and a "total sheet No." 703 is an identification number of the sheet in the final products for the set number of copies. It should be noted that the "total sheet No." 703 may be a sequential serial number in the total final products but the representation with the combination of the bundle No. and the sheet No. can be used. For example, in that case, "0203" of FIG. 21B represents the sheet 3 in the second bundle. A "front surface average density" and a "rear surface average density" are average densities of the toner image drawn on the front and rear surfaces of the sheet for each color.

In Step S204, the RFID tag is affixed to the sheet after the printing by the tag affixer 202. In Step S205, the job information and the image formation specific information in the memories in the control sections 101*a* and 102*a* of the respective printers are written in the memory in the RFID tag 106 by the reader/writer 203. In Step S206, until the final sheet in the job has been processed, Step S202 to S206 will be repeatedly performed.

When the image formation and RFID tag attachment process is completed for the final sheet, in Step S207, the operation section of the image forming device is caused to display that the operation has been finished and also display the next procedure of the post processing, and then the flow returns to the main routine S101 to S109. In the case of this example, the next procedure is the collating process, and accordingly that effect is displayed.

Collating Process Example 1: Step S108

Figure 18:
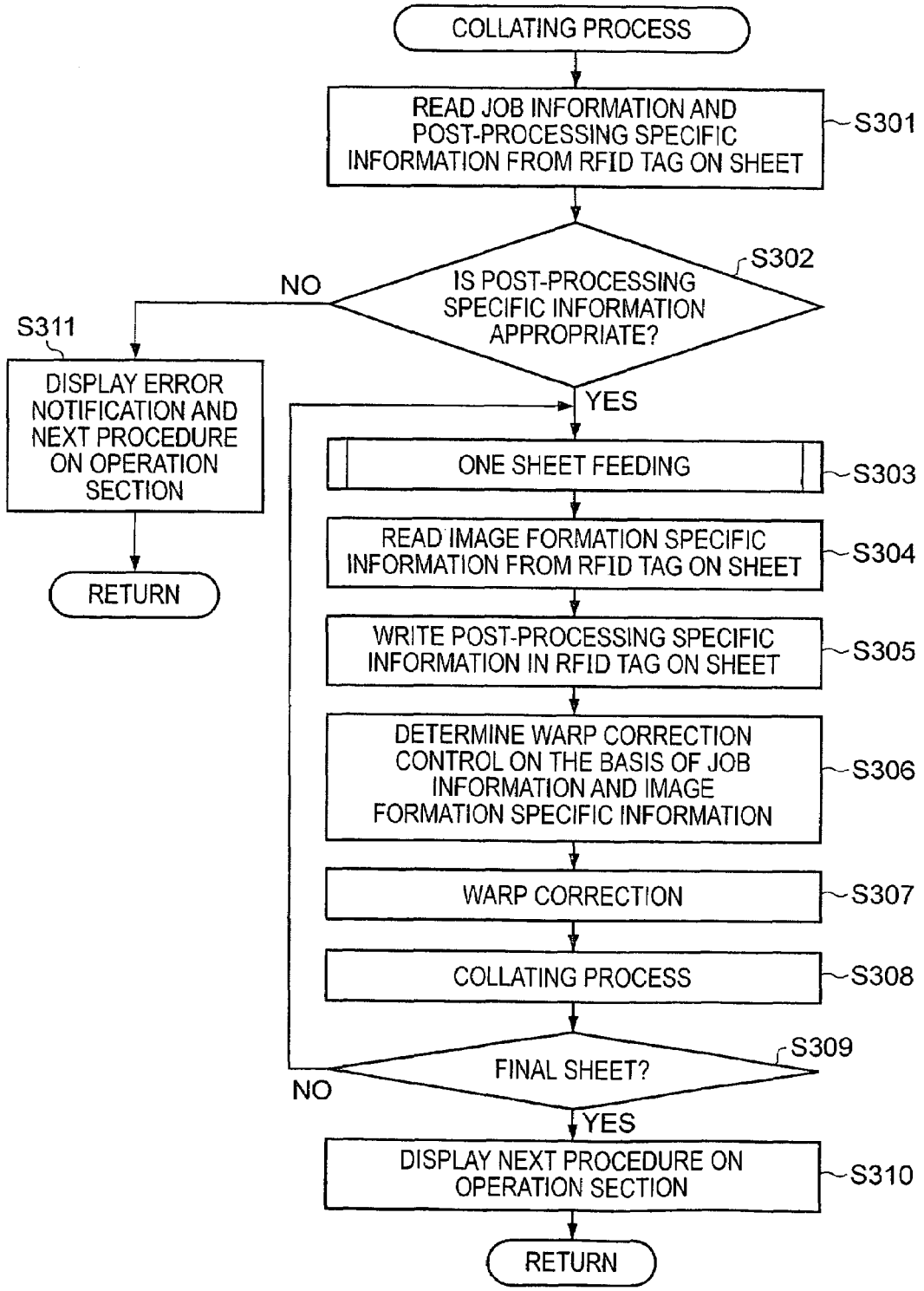
FIG. 18 is a flowchart of a sub routine for describing a first operational example of a collating process according to the embodiment.

FIG. 18 is a flowchart showing a subroutine of Step S108 (the collating process).

When the operator sets the discharged sheet bundles from the image forming devices 101 and 102 to the collator 103 and inputs the start instruction, in Step S301, the readers/writers 303 and 304 read the job information and the post-processing specific information stored in the memory in the RFID tag on the sheet and transfer the read information to the memory in the control section 103*a* (not shown in the drawings).

It should be noted that as the job information and the post-processing specific information are common information for each sheet bundle, it is possible to read any RFID tag attached to any sheet in the sheet bundle. In addition, as the RFID tag has a feature in which a plurality of RFID tags can be correctively read by one reader/writer, it is possible to prevent the read error generation due to the interference.

The post-processing specific information is information indicating the executed post processing history, and FIG. 21C shows the content. Items of the post-processing specific information record whether or not the "collating process" 801, the "staple process" 802, the "saddle stitching process" 803, the "case binding process" 804 are finished. At this point, since none of the post processings has been performed, all the items are set as "unprocessed".

In Step S302, by checking the presence or absence of the post processing 801 to 804 in the post-processing specific information and the type of each post-processing devices and the order of the post processings 607 (FIG. 21A) in the job information, it is judged whether the type and order of the post-processings to be executed are appropriate to the job. In this example, the post-processing history in the post-processing information corresponds to all "unprocessed" and the "collating or not/post-processing order" in the job information is set as "1" (the collating process is to be performed and the post-processing order is first). Therefore, it is judged that the post-processing information is appropriate (Yes). When it is judged that the type and order are inappropriate (No), in Step S311, the error notification and the appropriate post processing are displayed on the operation section of the collator 103 and the flow returns to the main routine.

In Step S303, one sheet is fed. Herein, the judgment of determining which one of the sheet feed trays 301 and 302 feeds the next sheet may be performed by the control section 103a of the collator 103 on the basis of the job information read in Step S301. Also, in order to reliably confirm the sheet order, before Step S303, by reading the image formation specific information from the RFID tag of each sheet with the readers/writers 303 and 304, it is also possible to confirm the sheet feeding order on the basis of the sheet No. and the total sheet No.

In Step S304, the reader/writer 306 reads and transfers the image formation specific information from the RFID tag to the memory in the control section 103a. In response to this, in Step S305, in the post-processing information the item of the "collating process" 801 is changed from "unprocessed" to "processed", and that effect is written in the RFID tag by the reader/writer 306. In Step S306, the control method for the warp correction unit 307 is determined on the basis of the job information and the image formation specific information.

To be specific, the pressuring force by the pressing unit of the warp correction unit 307 (not shown in the drawings) is controlled on the basis of the following information.
(1) The "image formation time" 701 in the image formation specific information and the elapsing time from the image formation calculated on the basis of the current time
(2) The "front surface and rear surface average density" 704 in the image formation specific information
(3) The "double-sided/the single-sided printing" 603 in the job information
(4) The "sheet type" 606 in the job information In Step S307, the warp correction is conducted by the warp correction unit 307. In Step S308, the collating process is conducted. Until the final sheet in the job has been processed, the processes in Step S303 to S309 will be repeatedly performed.

When the collating process has been completed for the final sheet, in Step S310, the completion of the operation is displayed on the operation section of the image forming device and the post-processing content of the next procedure is displayed. Thereafter, the flow returns to the main routine S101 to S109. In the case of this example, the next procedure is the case binding process and accordingly that effect is displayed.

Case Binding Process Example: Step S109

FIG. 19 is a flowchart showing a subroutine of Step S109 (the case binding process).

When the operator sets the sheet bundle discharged from the collator 103 to the case binding machine 104 and inputs the start instruction, in Step S401, the reader/writer 402 reads and transfers the job information and the post-processing specific information in the memory in the RFID tag on the sheet to the memory in the control section 104a (not shown in the drawings).

In Step S402, by checking the presence or absence of the post-processing history 801 to 804 (FIG. 21C) in the post-processing specific information and the type of each post-processing devices and the order of the post processings 607 (FIG. 21A) in the job information, it is judged whether the type and order of the post-processings to be executed are appropriate to the job. In this example, at this point, as the post-processing history indicates that only the collating process in the post-processing information is set as "unprocessed", "case binding or not/post-processing order" in the job information is set as "2" (the case binding process is to be performed and the post-processing order is second), it is judged that the post-processing information is appropriate (Yes). When it is judged that the type and order are inappropriate (No), in Step S409, the error notification and the appropriate post processing are displayed on the operation section of the case binding machine 104. Thereafter, the flow returns to the main routine.

In Step S403, one sheet is fed. In Step S404, it is judged that the process is the final procedure. Then, the reader/writer 407 deletes the job information, the image formation specific information, and the post-processing specific information from the memory in the RFID tag. In Step S405, it is judged whether or not one sheet bundle has been fed. When it is judged that the sheet bundle has not been fed, the flow returns to Step S403, and the next sheet is fed. When it is judged that one sheet bundle has been fed, the flow proceeds to Step S406, where the case binding process is performed. Until the final sheet in the job has been processed, the processes in Step S403 to S407 will be repeatedly performed.

When the case binding has been completed for the final sheet, in Step S408, the completion of the operation is displayed on the operation section of the image forming device, and the post-processing content of the next procedure is also displayed. Then, the flow returns to the main routine S101 to S109. In the case of this example, this step is the final procedure and accordingly that effect is displayed.

Finisher Process Example

FIG. 20 is a flowchart showing a subroutine of the finisher process. It should be noted that in this example, the finisher process is not performed so only the outline will be described.

When the operator sets the discharged sheet bundle to the finisher 105 and inputs the start instruction, in Step S501, the reader/writer 502 reads and transfers the job information and the post-processing specific information stored in the memory in the RFID tag on the sheet to the memory in the control section 105a (not shown in the drawings).

In Step S502, by checking the presence or absence of the post-processing history 801 to 804 (FIG. 21C) in the post-processing specific information and the type of each post-processing devices and the order of the post processings 607 (FIG. 21A) in the job information, it is judged whether the type and order of the post-processings to be executed are appropriate to the job. When it is judged that the type and order are inappropriate (No), in Step S516, the error notification and the appropriate post processing are displayed on the control section of the finisher 105 and thereafter the flow returns to the main routine.

In Step S503, it is judged whether the desired post processing is the saddle stitching binding process or the staple process. In step S504 or S510, one sheet is fed. In Step S505 or S511, it is judged whether or not this process is the final procedure, and the reader/writer 507 deletes the job information, the image formation specific information, and the post-processing specific information from the memory in the RFID tag. In Step S506 or S512, it is judged whether or not one sheet bundle has been fed. When it is judged that the sheet bundle has not been fed, the flow returns to Step S504 or S510 where the next sheet is fed.

In Step S507 or S513, the saddle stitching binding process or the staple process is executed. Until the final sheet in the job has been processed, the processes in Step S504 to S508 or the processes in S510 to S514 will be repeatedly performed.

When the process has been completed for the final sheet, in Step S509 or S515, the completion of the operation is displayed on the operation section of the finisher and the post-processing content of the next procedure is displayed. Thereafter, the flow returns to the main routine S101 to S109.

As described above, the first operational example for attaching the RFID tag to each sheet on which the image has been formed by the printer is described. According to the above-mentioned process, no matter how complicated the post processing becomes, the post-processing device can control the printing on a sheet basis, thereby making it possible to perform the accurate sheet management.

The Second Operational Example of the Image Forming System According to this Embodiment Hereinafter, the second operational example of the image forming system according to the present invention will be described. The construction of the image forming system for realizing this operational example and the basic part of the operation are the same as the first operational example. Therefore, the description for the common parts is omitted and only the characteristic part will be described.

In the first operational example, all the printing sheets are attached with the RFID tag. In the second operational example, not all the sheets but some sheets satisfying a specific condition are selectively attached with the RFID tag. The hardware construction for realizing the second operational example is the same as the first operational example. In the flowchart of the operation in the entire system shown in FIG. 15, subroutines in Step S107 (the image formation and RFID tag attachment process) and Step S108 (the collating process) are different from the first operational example.

The sheet to be subjected to the warp correction includes a sheet on which a high density image is printed substantially thereon and at the same time whose sheet type is small in elasticity like thin paper. However, in general, there are not many sheets satisfying the above-mentioned conditions, and it is considered that almost all the sheets do not need the warp correction. Therefore, in the second operational example, the RFID tag is attached to the sheet requiring the warp correction, whereby only a small number of RFID tags are used and still the effect of the present invention is attained.

Hereinafter, detailed operations of Step S107 (the image formation and RFID tag attachment process) and Step S108 (the collating process) will be described with reference to FIGS. 23 and 24.

Image Formation and RFID Tag Attachment Process Example 2: Step S107

FIG. 23 is a flowchart showing a subroutine of Step S107 (the image formation and RFID tag attachment process).

In Step S601, the printing order of the data by the respective printers in this job is determined on the basis of the job information stored in the memories in the control sections 101a and 102a of the printers. In Step S602, the image formation is performed for the first sheet. In Step S603, the image formation specific information is created in the memory.

In Step S604, the sheet warp amount is predicted on the basis of the job information and the image formation specific information described below. In Step S605, the sheet whose predicted value exceeds the predetermined value is subjected to the RFID tag attachment process.

(1) The "front surface and rear surface average density" 704 in the image formation specific information
(2) The "double-sided/single-sided printing" 603 in the job information,
(3) The "sheet type" 606 in the job information.

In Step S604, when the warp amount predicted value is not higher than the predetermined value, the RFID tag attachment process is not performed, and the flow skips to Step S607. In Step S606, the job information stored in the memories in the respective printers of the control sections 101a and 102a and the image formation specific information are written in the memory in the RFID tag 106 by the reader/writer 202. Until the final sheet in the job has been processed, the processes in Step S602 to S607 is repeatedly performed.

When the process has been completed for the final sheet, in Step S608, when there is a history of attaching the RFID tag in this job, the completion of the operation is displayed on the operation section of the image forming device, and the post-processing content of the next procedure is displayed. Thereafter, the flow returns to the main routine S101 to S109. When there is no history of attaching the RFID tag in this job at all, in Step S610, the RFID tag attachment process is performed on the final sheet, and the job information is written therein. Thereafter, the flow returns to Step S609, where the completion of the operation is displayed on the operation section of the image forming device, and also the post processing of the next procedure is displayed. Thereafter, the flow returns to the main routine S101 to S109. As a result, at least one RFID tag is definitely contained in the discharged sheet bundle, and information transfer to the next procedure is enabled.

Collating Process Example 2: Step S108

FIG. 24 is a flowchart showing a subroutine of Step S108 (the collating process).

When the operator sets the discharged sheet bundle from the image forming devices 101 and 102 to the collator 103 and inputs the start instruction, in Step S701, the readers/writers 303 and 304 read and transfer the job information and the post-processing specific information stored in the memory in the RFID tag on the sheet to the memory in the control section 103a (not shown in the drawings).

It should be noted that as the job information and the post-processing specific information is common information for every sheet bundle, it is possible to read any RFID tag attached to any sheet in the sheet bundle. In addition, as the RFID tag has a feature in which a plurality of RFID tags can be correctively read by one reader/writer, it is possible to prevent the read error generation due to the interference.

The post-processing specific information is information indicating the executed post processing history, and FIG. 21C shows the content.

In Step S702, by checking the presence or absence of the post-processing history 801 to 804 in the post-processing specific information and the type of each post-processing devices and the order of the post processings 607 (FIG. 18) in the job information, it is judged whether the type and order of the post-processings to be executed are appropriate to the job. When it is judged that the type and order are inappropriate (No), in Step S712, the error notification and the appropriate post processing are displayed on the operation section of the collator 103 and thereafter the flow returns to the main routine.

In Step S703, one sheet is fed. It should be noted that the selection of the sheet feed trays 301 and 302 in this example is performed on the basis of the job information read in Step S701 by the control section 103a of the collator 103.

In Step S704, the reader/writer 306 judges whether or not the sheet is attached with the RFID tag. When it is judged that the RFID tag is attached to the sheet, the reader/writer 306 reads the information stored in the memory in the RFID tag. In Step S705, the read image formation specific information is transferred to the memory in the reading control section 103a. Moreover, in Step S706, the item of the "collating process" 801 in the post-processing information is changed from "unprocessed" to "processed" and that effect is written in the RFID tag by the reader/writer 306.

In Step S707, the control method for the warp correction unit 307 is determined on the basis of the job information and the image formation specific information. To be specific, the pressing force by the pressuring unit of the warp correction unit 307 (not shown in the drawings) is controlled on the basis of the following information.

(1) The "image formation time" 701 and the elapsing time from the image formation calculated on the basis of the current time in the image formation specific information
(2) The "front surface and rear surface average density" 704 in the image formation specific information,
(3) The "double-sided/the single-sided printing" 603 in the job information
(4) The "sheet type" 606 in the job information In Step S708, the warp correction is performed by the warp correction unit 307.

On the other hand, regarding the sheet having no RFID tag attached, the flow skips from Step S704 to Step S709, and no the warp correction is performed.

In Step S709, the collating process is performed. Until the final sheet in the job has been processed, Step S703 to S710 is repeatedly performed.

The collating process has been completed for the final sheet, in Step S311, the completion of the operation is displayed on the operation section of the image forming device, and the post-processing content of the next procedure is displayed. Thereafter, the flow returns to the main routine S101 to S109.

In the second operational example, it is possible to minimize the number of RFID tags to be attached to the sheets, thereby making it possible to realize the on-demand printing at a low cost.

Other Operational Example and Configuration Example

In the first operational example described above, all the sheets after the image formation are attached with the RFID tags. In the second operational example, the sheet requiring the warp correction or the final sheet in one sheet bundle is attached with the RFID tag. However, in addition to the first operational example and the second operational example, in consideration of the cost of the RFID tag and convenience of the sheet management with the RFID tag, various operational examples are conceivable.

For example, when the RFID tag is used for the book management after book binding, it is also considered that the RFID tag is attached to at least one of the first sheet and the final sheet in the book. This process is effective for the case as well, in which each of the bound books has a relation of Volume 1 to Volume n or the like. Furthermore, a dummy sheet having an RFID tag is inserted in one of a plurality of bound books (the sheet is only aimed at the information transfer and is not subjected to the image formation), and therefore it is also possible to manage the packing of the bound books. The present invention encompasses such applications as well.

Also, in the above-mentioned embodiment, the RFID tag attachment devices 201-1 and 201-2 are installed at the downstream side in the sheet conveyance directions of the printers 101 and 102. However, when the RFID tag has satisfactory heat resistance and pressure resistance, the RFID tag attachment devices may be installed at the downstream side with respect to a sheet feed device.

Also, the sheet to which the RFID tag is previously attached may be set to the sheet feed device. In this case, it is unnecessary to employ the RFID tag attachment device.

Also, as in the network 100b indicated by the broken line of FIG. 1, the computer 100 can uniformly manage the entire system including the post-processing devices. In this case, furthermore, when the programs for controlling the control sections 103a to 105a of the post-processing devices are downloaded from the computer 100 in accordance with the system specification, the system in which the computer 100 can switch between the first operational example and the second operational example can be configured.

Also, in the above-mentioned embodiments, only the case where the procedural order is not normal is described as an error during the post processing. However, for example, other errors are conceivable such as the case where a necessary sheet is missing and the case where an extraneous sheet exists. The incorporation of processes for coping with these errors in the flow chart according to the above-mentioned embodiments can be easily performed by referring to the content of the RFID tag.

Also, in the above-mentioned embodiment, the printer, the collator, the case binding machine, and the finisher for the simple binding are respectively represented as an individual device, but an apparatus constructed by integrating any of these devices may be used. That is, the present invention may be applied to a system composed of a plurality of devices (for example, a host computer, an interface device, a printer, and the like), an integrated apparatus, or an apparatus composed of one device.

Also, the present invention can be achieved when a storage medium (or a recording medium) in which a program code of a software is stored for realizing the above-mentioned functions of the embodiment is supplied to the system or the apparatus, and a computer of the system or the apparatus (alternatively, the CPU or the MPU) reads and executes the program code stored in the storage medium. In this case, the program code itself read out from the storage medium realizes the above-mentioned functions of the embodiment, and the storage medium storing the program code embodies the present invention. Also, the following cases construct the present invention not only when the above-mentioned functions of the embodiment are realized by executing the program code read by the computer, but also when the operating system (OS) running on the computer or the like executes a part or an entirety of the actual process on the basis of instructions of the program code, and the above-mentioned functions of the embodiment are realized with the executed process.

Moreover, the following case of course constructs the present invention. After the program code read out from the storage medium is written in a memory that is provided to a function expansion card inserted in the computer or a function expansion unit connected to the computer, a CPU or the like provided to the function expansion card or the function expansion unit executes a part or an entirety of the actual process on the basis of the instructions of the program code, and the above-mentioned functions of the embodiment are realized with the executed process.

When the present invention is applied to the above-mentioned storage medium, the storage medium is configured to store the program code corresponding to the flowchart described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-156198 filed May 27, 2005, which is hereby incorporated by reference herein in its entirety.

What is claimed is:

1. A control method for an image forming system that includes first and second image forming devices performing image formation on sheets and at least one post-processing device performing a post processing on the sheets which have been subjected to image formation by the image forming devices, comprising:

sorting print jobs into a first print job to the first image forming device and a second print job to the second image forming device;

performing image formation on the sheet with the first image forming device;

writing attribute information including job information for indicating a post processing to be executed and identification information for identifying a page order of the sheets, in a memory of a radio frequency IC tag affixed to the sheet which has been subjected to the image formation by the first image forming device and which is placed on a first tray of the post-processing device;

performing image formation on the sheet with the second image forming device;

writing attribute information including job information for indicating a post processing to be executed and identification information for identifying a page order of the sheets, in a memory of a radio frequency IC tag affixed to the sheet which has been subjected to the image formation by the second image forming device and which is placed on a second tray of the post-processing device;

reading out with the post-processing device the attribute information from memories of radio frequency IC tags affixed to the sheets in a sheet bundle placed on the first tray and in the sheet bundle placed on the second tray;

selectively feeding the sheets from the sheets in the sheet bundle placed on the first tray and the sheets in the sheet bundle placed on the second tray on the basis of the read-out attribute information; and executing the post processing on the fed sheets.

2. The control method according to claim 1, wherein the first image forming device forms a color image and the second image forming device forms a monochrome image.

3. The control method according to claim 1, wherein the feeding the sheets includes feeding the sheets placed on the first tray and the second tray to conform to the page order on the basis of the attribute information.

4. The control method according to claim 1, further comprising:

affixing the radio frequency IC tags to the sheets in which image formation has been performed with the first image forming device and with the second image forming device.

5. The control method according to claim 1, wherein the performing image formation includes performing the image formation on sheets to which the radio frequency IC tags have been affixed in advance.

* * * * *